(12) United States Patent
Lam et al.

(10) Patent No.: US 12,049,299 B2
(45) Date of Patent: Jul. 30, 2024

(54) AIRFOIL SYSTEM

(71) Applicant: Lam Aviation, Inc., Los Altos Hills, CA (US)

(72) Inventors: Michael Lam, Los Altos Hills, CA (US); Gregory M. Cole, Bend, OR (US)

(*) Notice: Subject to any disclaimer, the term of this patent is extended or adjusted under 35 U.S.C. 154(b) by 323 days.

(21) Appl. No.: 17/438,110

(22) PCT Filed: Mar. 11, 2020

(86) PCT No.: PCT/US2020/022167
§ 371 (c)(1),
(2) Date: Sep. 10, 2021

(87) PCT Pub. No.: WO2020/185947
PCT Pub. Date: Sep. 17, 2020

(65) Prior Publication Data
US 2022/0177114 A1 Jun. 9, 2022

Related U.S. Application Data

(60) Provisional application No. 62/816,788, filed on Mar. 11, 2019.

(51) Int. Cl.
| | | |
|---|---|---|
| B64C 13/16 | (2006.01) | |
| B64C 9/00 | (2006.01) | |
| B64C 9/12 | (2006.01) | |
| B64C 9/18 | (2006.01) | |
| B64C 29/00 | (2006.01) | |

(52) U.S. Cl.
CPC ............... *B64C 13/16* (2013.01); *B64C 9/12* (2013.01); *B64C 9/18* (2013.01); *B64C 29/0025* (2013.01); *B64C 2009/005* (2013.01)

(58) Field of Classification Search
None
See application file for complete search history.

(56) References Cited

U.S. PATENT DOCUMENTS

| | | | | |
|---|---|---|---|---|
| 6,554,229 | B1 * | 4/2003 | Lam | B64C 9/06 244/217 |
| 6,561,456 | B1 * | 5/2003 | Devine | B64C 29/0025 244/12.3 |
| 7,309,043 | B2 * | 12/2007 | Good | B64C 9/323 244/99.2 |
| 9,846,432 | B2 * | 12/2017 | Lam | B64C 9/04 |
| 10,543,904 | B2 * | 1/2020 | Roberts | B64C 13/0425 |
| 11,046,421 | B2 * | 6/2021 | Decker | B64C 7/00 |
| 11,673,643 | B2 * | 6/2023 | Markley | B64C 5/06 244/119 |

* cited by examiner

*Primary Examiner* — Todd Melton
(74) *Attorney, Agent, or Firm* — Messner Reeves LLP

(57) ABSTRACT

A winged vertical take-off and landing aircraft with compound control surfaces comprising flaps and ailerons which can be operated simultaneously with each other offers improved aerodynamic performance and maneuverability. Configuration of the compound control surfaces may be varied to optimize performance in hovering (vertical) flight modes, cruising (horizontal) flight modes, and transitional flight modes.

17 Claims, 15 Drawing Sheets

Top View

HT2 DELTA (ELEV) 70 DEG

AIRFOIL SYSTEM

CROSS REFERENCE TO RELATED APPLICATIONS

The present application is a U.S. National Stage of PCT Application No. PCT/US2020/022167 filed on Mar. 11, 2020 which claims priority to U.S. Provisional Patent Application No. 62/816,788 entitled "Airfoil System" and filed on Mar. 11, 2019, the disclosures of which are incorporated herein by reference.

FIELD OF THE INVENTION

The present disclosure generally relates to vehicle wing design and more specifically to a method and apparatus for improving vehicle efficiency and limiting adverse yaw.

BACKGROUND OF THE INVENTION

Various airfoils have been implemented for airborne vehicles, such as a wing, a tail, and/or a propeller blade, which produces lift and drag when moved through the air. An airfoil produces a lifting force that acts at right angles to the airstream and a dragging force that acts in the same direction as the airstream. High-speed vehicles usually employ low-drag airfoils with low lift coefficients that are thin and streamlined. Slow vehicles that carry heavy loads typically use thicker airfoils with higher drag and higher lift coefficients. These two regimes conflict with each other. For vertical take-off and landing (VTOL) vehicles, which may be an electrically powered vertical take-off and landing vehicles (EVTOL), the requirements of the airfoil are much more demanding than those of conventional vehicle airfoils due to the various phases through which the vehicle is operated. The phases can include a take-off phase in which the vehicle is lifted in at least a partially vertical direction, forward flight and the transition between vertical and horizontal flight.

An aileron panel is a hinged panel on the trailing edge of the wing which, when deflected downwardly, increases the lift of that wing, to roll or bank the airplane into a turn. At the same time, the aileron panel on the other wing is conventionally deflected upwardly, to decrease the lift on that wing and thus augment the rolling motion. The configuration and application of the conventional aileron panel system has changed little, if at all, over more than a century since the first fixed-wing aircraft were produced.

One of the most objectionable features of conventional aileron panel application is a phenomenon known as "adverse yaw." virtually all existing fixed-wing aircraft suffer disadvantageous consequences associated with adverse yaw. When a turn or roll is initiated with conventional aileron panels, the nose of the airplane is driven in a direction opposite to that of the intended turn. This is usually compensated by using rudder deflection to "coordinate" the turn. The adverse yawing motion is a direct result of aileron panel application. While producing more lift to bank the airplane into a turn, the downwardly-deflected aileron panel also produces more drag, which acts momentarily to cause the airplane's nose to point in the direction opposite to the intended turn. That is, when one wing is lifted relative to the other wing by operation of a conventional aileron panel to bank the airplane into a turn, that wing is also pulled back away from the turn relative to the wing on the other side, causing the nose initially to turn, or yaw, in the direction opposite to the turn. This effect becomes increasingly detrimental as the roll rate increases and/or airspeed decreases.

Adverse yaw produced by the conventional aileron panel can also contribute to wing stall and spin entry. Instinctive application of conventional aileron panels during attempted spin recovery can aggravate the spin condition. When spinning, an airplane is descending and turning in a tight spiral flight path. The conventional aileron panel is not effective or helpful in spin recovery. In a left hand spin, for instance, the left wing is down and toward the center of the spiral. Instinctively, many pilots are tempted to initiate right stick or control yoke movement to roll towards the right and out of the spin. With conventional aileron panels this will deploy the left aileron panel down and the right aileron panel up. The left aileron panel may create more drag than the form drag caused by the up-going right aileron panel and the spin may be further aggravated. For an airplane equipped with conventional aileron panels, application of yaw control input most commonly with the rudder alone or combined with pitch control most commonly using elevator is used for spin recovery. Much of spin training involves conditioning pilots to avoid the instinctive attempt to roll out of the spin. Nonetheless, many pilots have aggravated spins by attempting such recoveries with conventional aileron panels and with fatal results.

Various methods and devices have been used to counter adverse yaw. Among them are the differential aileron panel with its finite deflection ratio, and the spoiler. The differential deflection of conventional aileron panels is the most commonly used solution and provides some marginal improvement, but has limitations. For instance, conventional aileron panels use a fixed-ratio linkage mechanism and are coupled to each other. This limits their ability to precisely counteract adverse yaw because the major causes of adverse yaw vary with lift.

Use of spoilers may obviate adverse yaw, but spoilers present their own problems. Spoilers are so named because they spoil or effectively eliminate lift. Ailerons deliver continuously variable changes in lift within their operational envelopes, whereas spoilers operate characteristically in a stepwise manner, being functionally either on or off, and thus are difficult to modulate between full and zero effect. Roll control is difficult to achieve with spoilers without complicated sub-systems or augmenting devices.

In addition, a conventional airfoil must operate in lifting conditions that are typically identified as Take Off, Cruise, and Landing. The modern method of improving airfoil performance over this operational range utilizes a slotted flap panel. The requirements of the conventional airfoil are typically defined as low drag cruise, higher lift with moderately increased drag for the takeoff flap panel position, and a high lift landing flap panel position. The use of the slotted flap panel has been very successful, and its moderate complexity and weight are more than offset by increased performance in these three configurations. Conventional ailerons and conventional flaps also compromise each other and aircraft performance with the conflicting requirements for high and low speed flight.

BRIEF SUMMARY

In an example embodiment, a vertical take-off-and-landing aircraft might be comprised of a fuselage; a first wing coupled to the fuselage; a second wing likely contralateral to the first; a propulsion system; and a flight control system configured to operate the aircraft in a hovering flight mode and a horizontal cruising flight mode and the transition phase between the two modes. The first wing includes a compound control surface at a trailing edge of the first wing and this first compound control surface includes a first flap and a first upper aileron panel disposed directly above the first flap. The first aileron and the first flap are simultaneously operable with each other and are also capable of independent movement. This has been previously developed and described as the LAM aileron. The second wing includes a second compound control surface at a trailing edge of the second wing and the second compound control surface includes a second flap and a second aileron disposed directly above the first flap. The second aileron and the second flap are simultaneously operable with each other and are capable of independent movement. There may be multiple sets of these compound LAM ailerons on each wing.

When the aircraft is operated in the vertical or hovering flight mode the propulsion system generates downward thrust in a direction substantially perpendicular to a plane defined by the wings; the first and second flaps are pivoted about leading edges of the first and second flaps such that trailing edges of the first and second flaps are angled downward with respect to the trailing edges of the first and second wings; and the first and second ailerons are pivoted about leading edges of the first and second ailerons such that trailing edges of the first and second ailerons are angled downward with respect to the trailing edges of the first and second wings. When the aircraft is operated in the horizontal cruising flight mode, the ailerons may be deflected upwardly only from a neutral position or stowed position or may move together both upwardly and downwardly with the lower flap panels.

In some such embodiments, when the aircraft is operated in the horizontal flight mode, the flight control system responds to a control input corresponding to a banking turn toward a direction nearest the first wing by: actuating the first aileron upward with respect to the first wing and maintaining the second aileron in a neutral position with respect to the second wing.

In some such embodiments, when the aircraft is operated in the hovering flight mode the first flap is pivoted downward from a neutral position of that flap and the first aileron is pivoted downward from a neutral position of that aileron such that a bottom surface of the first aileron rests on a top surface of the first flap and forms a single airfoil with the first flap and the second flap is pivoted downward from a neutral position of that flap and the second aileron is pivoted downward from a neutral position of that aileron such that a bottom surface of the second aileron rests on a top surface of the second flap and forms a single airfoil with the second flap.

In some such embodiments, when the aircraft is operated in the hovering flight mode, the leading edges of the first and second flaps are extended away from a trailing edge of the first wing, forming open spaces wider than chords of the first and second ailerons and greater than the spans of the first and second ailerons. When the first and second ailerons are pivoted about the leading edges of the first and second ailerons the trailing edges of the first and second ailerons pass through the open spaces and the trailing edges of the first and second ailerons extend below the leading edges of the first and second flaps and allow air to flow through apertures formed between the top surfaces of the first and second ailerons and the top surfaces of the first and second flaps In some such embodiments, when the aircraft is operated in the hovering flight mode, the flight control system responds to a control input corresponding to a lateral motion in a selected directed by actuating the flaps of the first and second wings without actuating the upper aileron panels of the first and second wings to move the aircraft in the selected direction.

In some such embodiments when the aircraft is operated in the hovering flight mode, the flight control system responds to a control input corresponding to a lateral motion in a selected directed by actuating the flaps of the first and second wings to move the aircraft in the selected direction while maintaining the ailerons of the first and second wings at a fixed downward deflection with respect to the first and second wings.

In some such embodiments when the aircraft is operated in the horizontal flight mode the flight control system responds to a control input indicating a banking turn by: receiving a displacement signal indicating an amount of displacement of a control device from a neutral position and a displacement direction of the control device; generating a first electronic control signal proportional to the amount of the displacement of the control device and related to a magnitude of the displacement signal by a first mathematical constant; and transmitting the electronic control signal to one of the first and the second aileron to execute the banking turn according to the control input indicating the banking turn.

In some such embodiments, when the aircraft is operated in a transitional flight mode the flight control system responds to the control input indicating the banking turn by: receiving the displacement signal indicating the amount of displacement of the control device from the neutral position and the displacement direction of the control device; generating a second electronic control signal proportional to the amount of the displacement of the control device and related to the magnitude of the displacement signal by a second mathematical constant having a greater absolute value than the first mathematical constant; and transmitting the second electronic control signal to one of the first and the second aileron to execute the banking turn according to the control input indicating the banking turn. In some embodiments, Generating the second electronic control signal may include: receiving, by the flight control system, sensor data indicating an airspeed of the aircraft; retrieving a value of the first mathematical constant corresponding to the airspeed of the aircraft from an electronic memory storing a set of values of the first mathematical constant, each value corresponding to a different airspeed value.

In another example embodiment, a vertical take-off-and-landing aircraft comprises: a body; a propulsion system; airfoils; and a flight control system configured to operate the aircraft in a hovering flight mode and a horizontal cruising flight mode. Each airfoil has a compound control surface at a trailing edge of the that airfoil. Each compound control surface includes a flap and an upper aileron panel disposed directly above the flap. The aileron and the flap panels of each airfoil are simultaneously operable with each other. When the aircraft is operated in the hovering flight mode the propulsion system generates downward thrust; the flaps of each airfoil are pivoted about leading edges of those flaps such that trailing edges of those flaps are angled downward with respect to the trailing edges of that airfoil; and the ailerons of each airfoil are pivoted about leading edges those ailerons such that trailing edges those ailerons are angled downward with respect to the trailing edge of that airfoil. When the aircraft is operated in the horizontal cruising flight mode the aileron panels of each airfoil may be deflected upward only from the neutral position of that aileron; and the flight control system responds to a control input indicating a banking turn by: actuating an upper aileron panel of an airfoil nearest a direction of the banking turn upward with respect to that airfoil; and maintaining ailerons of other airfoils in neutral position with respect to those airfoils.

In some such embodiments, when the aircraft is operated in the hovering flight mode, the flap of each airfoil is pivoted downward from a neutral position of that flap and the aileron of that airfoil is pivoted downward from a neutral position of the aileron such that a bottom surface of the aileron of that airfoil rests directly above a top surface of the flap of that airfoil and forms a single downward extension of that airfoil with the flap of that airfoil.

In some such embodiments, when the aircraft is operated in the hovering flight mode, the leading edge of the flap or each airfoil is extended away from a trailing edge of that airfoil, forming an open space wider than the chord of the flap that airfoil and longer than the span of the aileron of that airfoil. When the aileron of each airfoil is pivoted about the leading edge of the aileron of that airfoil, a trailing edge of the aileron of that airfoil passes through the open space; and the trailing edge of the aileron of that airfoil extends below the leading edge of the flap of that airfoil and allows air to flow through an aperture formed between the top surface of aileron of that airfoil and the top surface of the flap of that airfoil.

In some such embodiments, when the aircraft is operated in the hovering flight mode, the flight control system responds to a control input corresponding to a lateral motion in a selected directed by actuating the flaps of the of the airfoils while preventing actuation of the ailerons of the airfoils.

In some such embodiments, when the aircraft is operated in the hovering flight mode, the flight control system responds to a control input corresponding to a lateral motion in a selected directed by actuating the flaps of the first and second wings without actuating the ailerons of the first and second wings to move the aircraft in the selected direction.

In some such embodiments, when the aircraft is operated in the horizontal flight mode the flight control system responds to a control input indicating a banking turn by: receiving a signal indicating a desired banking angle; receiving sensor data indicating a current banking angle; generating a first electronic control signal proportional to a difference value between the current banking angle and the desired banking angle displacement of the control device and related to the difference value by a first mathematical constant; and transmitting the first electronic control signal to an appropriate aileron while maintaining other ailerons in neutral positions. In some such embodiments, generating the second electronic control signal may include: receiving, by the flight control system, sensor data indicating an airspeed of the aircraft; retrieving a value of the first mathematical constant corresponding to the airspeed of the aircraft from an electronic memory storing a set of values of the first mathematical constant, each value corresponding to a different airspeed value.

In another example embodiment, a method of controlling vertical take-off-and-landing aircraft including a fuselage and a propulsion system; a first wing coupled to the fuselage, and a second wing coupled to the fuselage where first includes a wing with a LAM aileron at a trailing edge of the first wing and the second wing includes a LAM aileron at its trailing edge; and a flight control system configured to operate the aircraft in a hovering flight mode and a horizontal cruising flight mode and the transition phase between the two modes. The method comprises operating the aircraft in the hovering flight mode by causing the flight control system to: cause the propulsion system to generate downward thrust in a direction substantially perpendicular to a plane defined by the wings; pivot the first and second flaps about leading edges of the first and second flaps such that trailing edges of the first and second flaps are angled downward with respect to the trailing edges of the first and second wings; and pivot the first and second ailerons about leading edges of the first and second ailerons such that trailing edges of the first and second ailerons are angled downward with respect to the trailing edges of the first and second wings. The method further comprises causing the flight control system to prevent the first and second ailerons from rotating downward beyond a neutral position while operating the aircraft in the horizontal cruising flight mode.

In some such embodiments, the method includes executing a banking turn while operating the aircraft in the forward flight mode by transmitting a control input indicating a banking turn toward a direction nearest the first wing to the flight control system, causing the flight control system to: actuate the first upper aileron panel upward with respect to the first wing; and maintain the second aileron in a neutral position with respect to the second wing.

In some such embodiments, method further includes placing the aircraft in the hovering flight mode by causing the flight control system to: pivot the first flap downward from a neutral position of that flap and pivot the first aileron downward from a neutral position of that aileron such that a bottom surface of the first aileron rests on a top surface of the first flap and forms a single airfoil with the first flap; and pivot the second flap downward from a neutral position of that flap and pivot the second aileron downward from a neutral position of that aileron such that a bottom surface of the second aileron rests on a top surface of the second flap and forms a single airfoil with the second flap.

In some such embodiments, the method further includes placing the aircraft in the hovering flight mode by causing the flight control system to: extend the leading edges of the first and second flaps away from a trailing edge of the first wing, forming open spaces wider than the chords of the first and second upper aileron panels and longer than the spans of the first and second upper aileron panels; and causing the flight control system, while pivoting the first and second ailerons about the leading edges of the first and second ailerons, to: cause the trailing edges of the first and second ailerons to pass through the open spaces; and cause the trailing edges of the first and second ailerons to extend below the leading edges of the first and second flaps, thereby allow air to flow through apertures formed between the top surfaces of the first and second ailerons and the top surfaces of the first and second flaps.

The above features and advantages of the present invention will be better understood from the following detailed description taken in conjunction with the accompanying drawings.

DETAILED DESCRIPTION

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Figure 1:
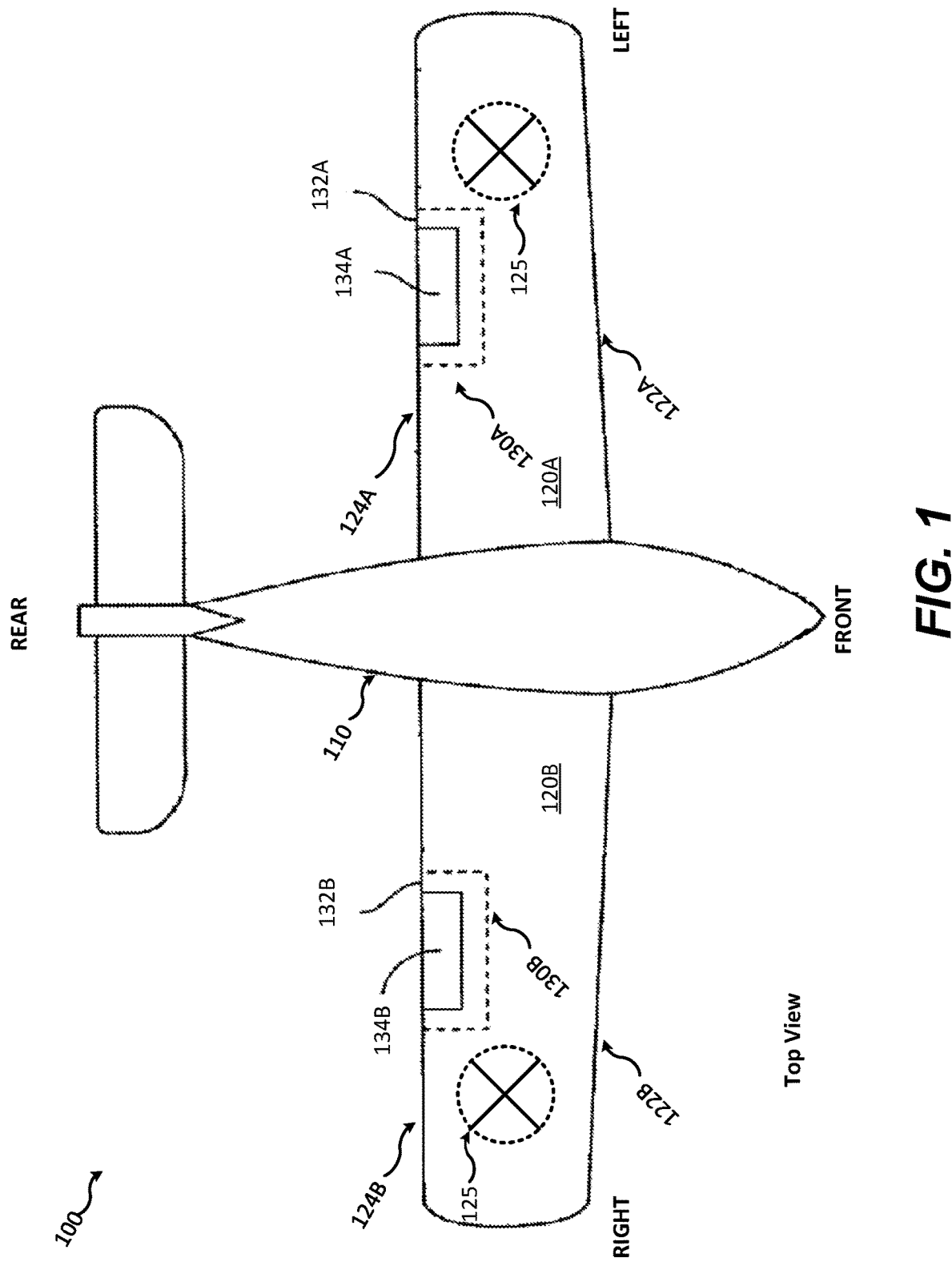
FIG. 1 is a schematic illustration of an aircraft with compound control surfaces.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if any assembly or composition is described as containing components A, B, and/or C, the assembly or composition can contain A alone; B alone; C alone; A and B in combination; A and C in combination; B and C in combination; or A, B, and C in combination.

VTOL vehicles operate in various phases, including a hover condition and a transition condition, where a wing is often a detriment and reduces hover performance. However, a wing can be needed for efficient forward flight and safe recovery in the event of power loss. The transition phase, bridging vertical and horizontal flight, is even more demanding. Many aspects of the transition phase complicate the requirements of the airfoil. One issue is the transition from significant separated flow to attached flow. Add in lateral control requirements and the transition phase is further complicated. The VTOL cannot abandon the requirement for low cruise drag provided by a wing as this phase of flight is likely to consume the largest portion of energy, which in the cases of an EVTOL is battery energy. Therefore, there is a need for an improved airfoil design that uses aileron panels that can be controlled to improve operational efficiency for VTOL vehicle.

The following airfoil configurations are intended to improve VTOL and EVTOL performance throughout the flight envelope (which can include a hover phase, a transition phase, and a cruising phase) through an improved wing design incorporating a system having aileron panel structures that are utilized to improve vehicle flight performance and efficiency and reduce the deficiencies associated with convention wing structures of VTOL vehicle. The control system mitigates the problems described above, including adverse yaw, while offering desirable features not possessed by conventional wings disposed on conventional VTOL vehicle, such as increased efficiency of the vehicle by utilizing the system disclosed herein. In some examples, the airfoil is configured to have a very high thickness ratio and high lift coefficients but with much lower cruise lift coefficients.

The aileron panels are generally comprised of at least one moveable panel located at the rear portion of the wing, in a span wise direction and aligned with the wing's trailing edge. In some implementations, the aileron panel can be located on the wing directly over a conventional flap panel.

In some cases, the flap panel may be modified so that the flap panel is configured to move downwards and/or extend away from the wing to provide a conventional flap panel function, while also being able to rotate upwards in the same manner as the aileron panel. In that case, the aileron panel and the flap panel may together function as a single controllable panel.

The aileron panel may be independently hinged at its leading edge portion or may be hinged on a common axis with the lower flap panel and rotate to make angular deflections with respect to the wing. In some examples, the aileron panel is combined with a lower flap panel such that the aileron panel can be deflected upwardly only from the neutral position, while the lower, auxiliary flap panel is capable of both upward and downward deflections from its neutral position. In that case, the upper aileron panel is deployed independently as an aileron panel and the lower panel is deployed independently as an auxiliary flap panel. Both panels can be deployed together upwardly as an aileron panel.

During the cruising phase, as with other aileron panels, deflection results effectively in a change of the airfoil's camber and thus a change in the lift coefficient CL for the corresponding wing. In the case of the present disclosure, the upward deflection of the aileron panel results in a negative change in CL. The wing deploying the aileron panel then produces less lift than the other wing with its aileron panel being maintained in a neutral position. Thus, the wing on which the aileron panel is being deployed drops and the vehicle is rolled toward the lowered wing into a turn. The upwardly-deflected aileron panel protrudes into the stream of air flowing over the wing, creating form drag, to rotate the nose of the vehicle toward the turn. Unlike activation of conventional aileron panels (which produce the opposite effect), this action produces favorable yaw.

During the hover and/or transition phases, the aileron panel may have a downward deflection that can reduce blockage of the downward flow from the hover rotors. In addition, movement of control flap panels makes yaw control possible, which may be analogous to lateral control flap panel deflection. Accordingly, the system can reduce blockage of the downward flow from the hover rotors during these phases. Movement of control flap panels makes yaw control possible (analogous to lateral control flap panel deflection).

In some examples, the pilot is provided with a conventional flight control input (e.g., flight control rudder, yoke, or control column) that enables the pilot to directly control the position of aileron panels. This control may be provided using conventional mechanical and/or electrical linkages that allow the pilot to set the position of each aileron panel. That control input causes aileron panels to change position, thereby enabling some movement of the vehicle. For example, if the pilot wishes to roll the vehicle to the right (causing the right wing to move downwards), the pilot provides the suitable control input using the vehicle's control column.

In some examples, such as those illustrated below in reference to the Figures, because the aileron panel can be configured to be deflected in an upward direction, the aileron panels can be installed into the wing over a complementary flap panel structure. This characteristic allows for the installation of aileron panels on existing wing structures that already include conventional aileron panel and flap panel structures. As such, the present aileron panels may be installed as a retrofit into existing wing structures.

In addition, the aileron panels may be controlled electronically, such as in a fly-by-wire system. Alternatively, the aileron panels may be controlled mechanically. In either case, the aileron panels by themselves may not provide the same 'feel' to the pilot as conventional aileron panels. In the fly-by-wire system, the aileron panels can be driven by a servo or otherwise driven electronically (e.g., by an electronic actuator coupled to a hydraulic or other mechanical mechanism, as non-limiting examples) and so physical feedback may not be provided to the pilot. In mechanically-driven aileron panels, because the aileron panels are not connected to one another (in the same fashion as conventional aileron panels) the aileron panels are not driven to their respective neutral positions, resulting in reduced pilot feel at a neutral control input. In such a wing, relatively small conventional aileron panels may be added to the wing and connected to the pilot's control system. As such, the conventional aileron panels may be utilized to provide improved pilot feel using a wing configured in accordance with the present disclosure.

FIG. 1 is a schematic of a dual-wing aircraft with a propulsion system (not shown) which may include any suitable combinations of rotors, jets, or any other suitable arrangement of propulsion devices capable of providing both horizontal and vertical thrust as defined with respect to the front, rear, top, and bottom of the aircraft 100 as indicated in FIG. 1. The aircraft 100 has a fuselage 110 and airfoils, depicted as wings 120A,B coupled to the fuselage having leading edges 122A,B and trailing edges 124A,B. As a non-limiting example, the aircraft 100 may have rotors used to support vertical (hovering) flight modes such as the rotors 125 depicted which may be suspended above the surface of each wing 120. It should be noted that rotors 125 may be coupled to any part of the aircraft in order to provide the desired vertical flight mode and that in various embodiments, the aircraft 100 may include more or fewer than two rotors 125. In an embodiment, rotors 125 may be positioned over one or both of their respective compound control surfaces 130A,B. In some embodiments, the position of the rotors 125 may be controlled to provide vertical thrust, horizontal thrust, or a combination of vertical or horizontal thrust. In other embodiments, separate components may be used to deliver vertical thrust and distinct components may be used to deliver horizontal thrust.

The wings 120A,B are provided with respective compound control surfaces 130A,B at their trailing edges 124A, B. Each compound control surface 130 includes a flap 132 and an upper aileron panel 134 (i.e., flaps 132A,B and ailerons 134A,B). The ailerons 134A,B are disposed above the flaps 132A,B. Each aileron 134 may be operated simultaneously with each flap 132. In certain embodiments a flap 132 and aileron 134 within a single compound control surface 130 may be operated jointly (i.e., actuated in the same direction and operating as single control surface) and/or independently, according to various embodiments disclosed herein.

It should be understood that the aircraft 100 of FIG. 1 is intended for the purposes of illustration only and that aircraft according to various embodiments need not resemble the aircraft 100. For example, the fuselage 110 need not have the form shown and may instead have any suitable form. Furthermore, aircraft according to embodiments herein may also have advanced of other unconventional configurations including flying wings in which a fuselage and wings are blended into a single structure. It should also be understood that any suitable arrangement of vertical propulsion devices may be used. Similarly, it should be understood that the compound control surfaces 130 may be larger or smaller relative to other components than depicted and that embodiments may employ different numbers of compound control surfaces 130 and may also be accompanied by various other control services, non-limiting examples of which are conventional flaps, conventional ailerons, "flaperons," and so forth.

Figure 2:
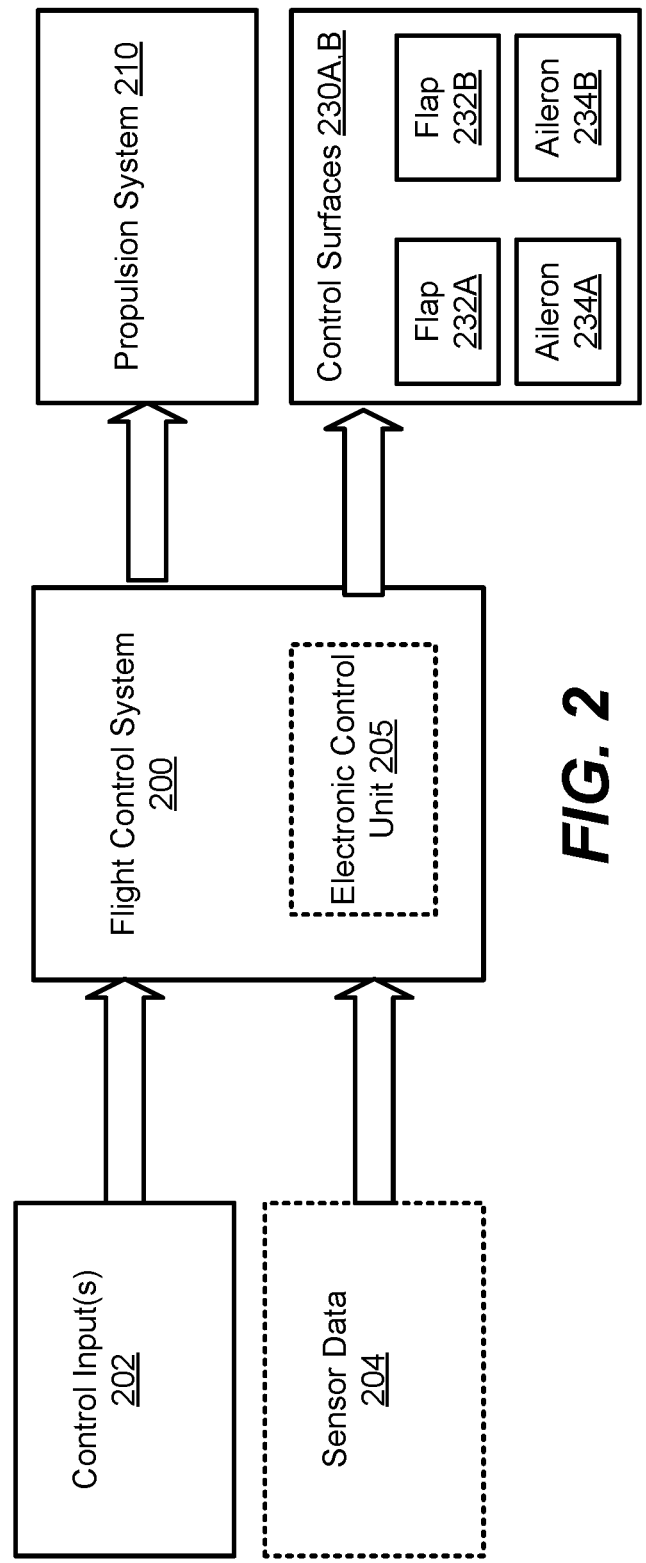
FIG. 2 is a block-level schematic illustrating operation of a flight control system for use in embodiments disclosed herein.

FIG. 2 illustrates components that may be used to control an aircraft such as the aircraft 100 of FIG. 1 according to embodiments disclosed herein. A flight control system 200 receives control inputs 202 and sensor data 204. The control inputs may be coupled to the flight control system mechanically (e.g., using hydraulic components as a non-limiting example) or electronically. The control inputs 202 may be received from one or more devices operated by a pilot such a control yoke, side stick, or other suitable device. The sensor data 204 may include information received or derived from devices such as airspeed indicators, pressure sensors, attitude sensors, linear and/or rotary position indicators coupled to various mechanical components of an aircraft (e.g., the aircraft 100). Using the control inputs 202 and the sensor data 204 as appropriate, the flight control system 200 may control a propulsion system 210 comprising any suitable combination of thrust-producing elements such as rotors, jet engines, or the like in order to regulate air speed and other flight parameters. The flight control system 200 may also control various control surfaces, shown in FIG. 2 as the compound control surfaces 230 each composed of a flap 232 and an aileron 234 (i.e., control surfaces 230A,B with respective flaps 232A,B and respective ailerons 234A, B) which may correspond to an arrangement of control surfaces such as shown in FIG. 1.

In various examples, a flight control system such as the flight control system 200 with an electronic control unit 205 (ECU) coupled to control surfaces such as the control surfaces 130A,B and 230A,B. The ECU 205 is able to calculate a suitable position of the ailerons 234 and then cause motors to move the aileron panels to that position. Likewise, the ECU 205 can also control movement of the flaps 232. The ECU 205 can calculate this effective position based on a number of different factors including the VTOL phase, vehicle speed, dynamic pressure, density of the surrounding air, and/or other aerodynamic parameters. The position of the ailerons 234 can be detected, for example, from a sensor located on or near the aileron panels or the mechanical linkage between the vehicle control column and aileron panels. The ECU can vary the amount of deflection of the aileron panel based on combinations of the factors described above, or any other practicable factor.

The ECU 205 is able to calculate a suitable position of the ailerons and then cause servo motors or other suitable actuators (e.g., electronically-controllable hydraulic systems or electronically-controllable mechanical systems, as non-limiting examples) to move the ailerons 234A,B to that position. The ECU 205 can calculate this effective position based on a number of different factors including the position additional conventional ailerons, aircraft speed, dynamic pressure, density of the surrounding air, and/or other aerodynamic parameters. The position of conventional ailerons can be detected, for example, from a sensor located on or near those ailerons or the mechanical linkage between the aircraft control column and those ailerons. The sensor data 204 may include, for example, an electronic signal from a potentiometer coupled to a hinge that rotates with pilot input coupled to the aircraft's conventional ailerons. As the hinge rotates, that rotation can be measured by the potentiometer. Based upon the measured rotation, a position of the conventional aileron panels can be determined and suitable inputs to one or more ailerons derived therefrom. The sensor data 204 may report the position of the conventional ailerons to the ECU 205, which then uses this information to calculate an optimal position of the ailerons 234A,B belonging to the compound control surfaces 230. When referring to embodiments in which conventionally controlled ailerons are supplemented by actively-controlled ailerons, the actively controlled ailerons are referred to as "LAM ailerons" to distinguish them from the conventional ailerons.

In one implementation, the ECU 205 determines that a conventional aileron is deflected upwards. The ECU 205 then determines that the LAM aileron 234 on the opposite side of the upwardly-deflected aileron (i.e., the LAM aileron 234 on the same wing as the downwardly-deflected aileron) will be maintained in a neutral position and that the LAM aileron 234 on the same wing as the upwardly-deflected aileron will also be deflected upwardly. In order to determine the degree to which each LAM aileron 234 should be deflected, the ECU 205 calculates a degree of LAM aileron 234 deflection based upon the measurement amount of conventional aileron deflection on the same wing. Alternatively, rather than determine a position of conventional aileron deflection, the ECU 205 may instead determine a desired deflection of the LAM ailerons 234 based upon one or more of the control inputs 202 and/or sensor data 204 (e.g., position of a control column, other pilot-based flight control input), speed of the airplane, dynamic pressure, or density of the surrounding air.

The ECU 205 can vary the amount of deflection of a LAM aileron 234 based on combinations of the factors described above. In one implementation, the ECU 205 detects that the conventional aileron on one of the aircraft's wings is deflected upwards by a particular angle. In response, the ECU 205 sets the LAM aileron 234 on that same wing (e.g., one of the wings 120) to the same upwards angle of deflection, while the other LAM aileron 234 (on the wing on which the conventional aileron is deflected downwards) is set to its neutral position. In this implementation, the position of the LAM ailerons 234 is determined in a linear fashion based upon a position of the aircraft's conventional ailerons by the ECU 205.

In other implementations, though, the position of the LAM ailerons 234 may be determined in view of a number of factors. For example, when the aircraft is at cruising speed, the amount of LAM aileron 234 deflection may be minimal. This is possible because at high speed even very small deflections of the aircraft's conventional ailerons are sufficient to control the aircraft. When the aircraft is at low speed (e.g., preparing to land), however, the amount of LAM aileron 234 deflection may be increased substantially. This enables the LAM ailerons to provide significant assistance to the conventional ailerons in controlling the aircraft at relatively low speed. As such, the ECU 205 could use a scaling factor to determine the degree to which the LAM ailerons should be moved in response to detected conventional aileron deflection or control inputs. The scaling factor could be selected so that during high speed maneuvers a deflection of the conventional ailerons causes a minimal movement of the LAM ailerons 234 (if at all), while during low speed maneuvers, that same deflection of the conventional ailerons could result in a much larger movement of the LAM ailerons 234 and, thereby, greater assistance in controlling the aircraft adjusted as to need.

In such an implementation, the ECU 205 may use factors such as aircraft speed, dynamic pressure, and/or density of surrounding air to determine whether the aircraft is undergoing a high or low speed maneuver. As such, the ECU 205 can be configured to determine a factor that can be applied to the detected movement of the conventional ailerons to determine the degree to which the LAM ailerons 234 should be deflected.

By implementing a sliding scale in which during a low speed maneuver more LAM aileron deflection is utilized, a more efficient wing design may be utilized. Specifically, a wing may be constructed using the smallest conventional ailerons that, when used by themselves, allow for safe operation of the aircraft. Such small conventional ailerons in combination with the LAM ailerons result in an aircraft wing that allows for very efficient cruise and maneuvering at high speeds and reduced adverse yaw and markedly improved flight handling characteristics at low speeds. In such an implementation, the sliding scale deployment of the LAM ailerons would result in more improved maneuvering at low speed (where the LAM ailerons provide more assistance to the conventional ailerons in controlling the aircraft), and more efficient flying at high speed (where the LAM ailerons are minimally deployed, if at all) where the small conventional ailerons could be sufficient for aircraft control. Also, in such an implementation, even in the event of failure of the LAM ailerons, the conventional ailerons would be sufficient to provide for safe control of the aircraft. The added efficiency of this arrangement may also remove the necessity of leading-edge lift creating device such as leading-edge slats or augment their effectiveness.

Accordingly, the ECU 205 is configured to receive the sensor data 204. The sensor data 204 may include information regarding a number of operating conditions of the aircraft, such as its flight speed, air dynamic pressure, and/or density of the surrounding air. Then, based on the flight speed, the ECU 205 can alter the deflection of the LAM ailerons 234. In one embodiment, at low speeds, the ECU 205 will deflect the LAM ailerons 234 to match the deflection of the conventional ailerons. At higher speeds, it can be beneficial to deflect the LAM ailerons 234 at a smaller degree than the conventional ailerons to provide for more efficient flight. Therefore, in this example, the ECU 205 may factor in an airplane's speed in calculating a position of the LAM ailerons 234. The ECU 205 can also take into account other various external factors such as the air dynamic pressure or air density in determining a position of the LAM ailerons 234.

Figure 3A:
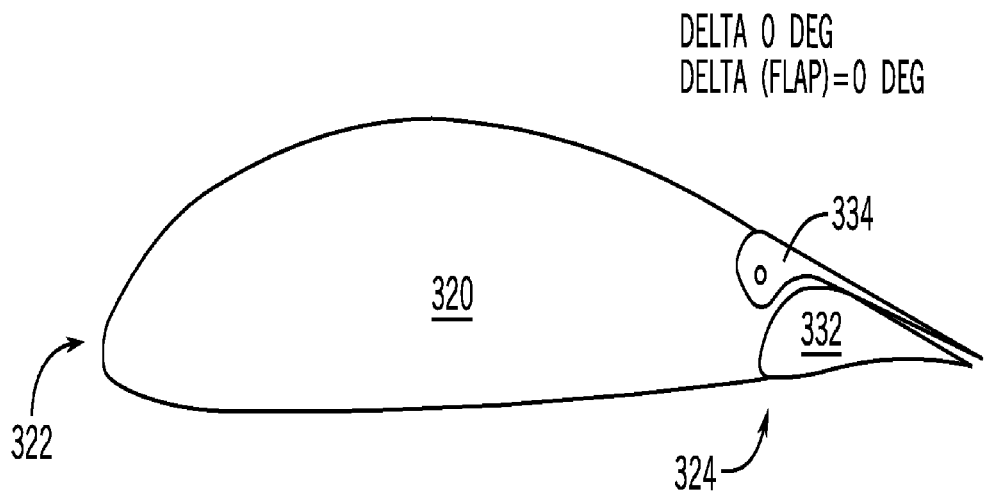
FIGS. 3A-B are cross-sectional schematic views of an airfoil provided with a compound control surface according to embodiments disclosed herein in different configurations.
Figure 3B:
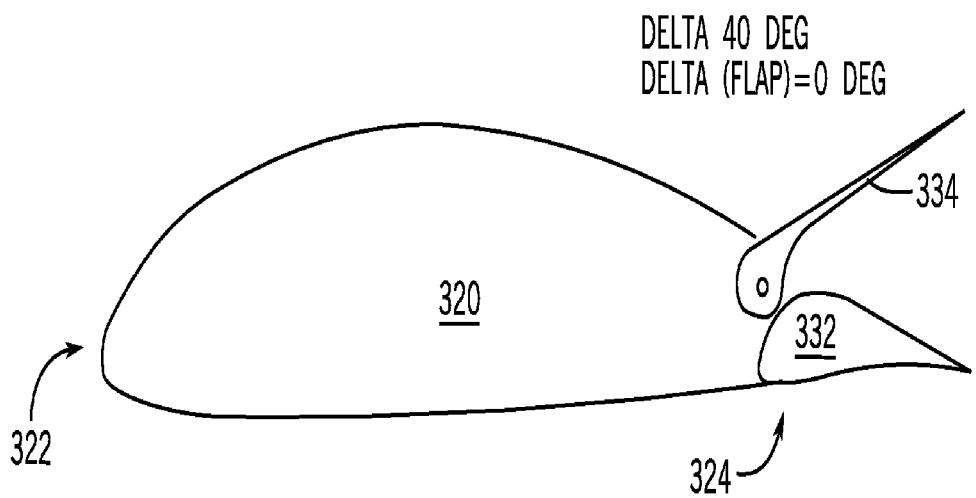

In some examples, while the vehicle is moving in the cruise phase, the system may be disposed in a cruise configuration. The cruise configuration is concerned with lower lift coefficients associated with cruise, structural requirements, and low drag. Lateral control is accomplished with a combination of conventional, though reduced in span, aileron panel surfaces and control flap panels as those shown below in FIGS. 3A and 3B illustrating the wing 320 having a leading edge 322 and trailing edge 3245 in cross-section with a compound control surface 330 formed by flap 332 and an aileron 334 disposed above the flap 332 at the trailing edge 324 of the wing 320. The neutral positions of the elements of the compound control surface 330 are shown in FIG. 3A while FIG. 3B illustrates the position of the aileron 334 and flap 332 during execution of a maneuver such as a banking turn toward a direction closest to the wing 320 which the aileron 334 may be rotated upward, decreasing the lift of the wing 320 compared to the configuration of FIG. 3A. When the aileron 334 is raised as shown, the increased form drag on the wing 320 will also induce a yawing force in the same direction as the turn; i.e., an aircraft employing the wing 320 as shown may complete a banking turn without experiencing adverse yaw, instead producing favorable yaw.

Figure 4:
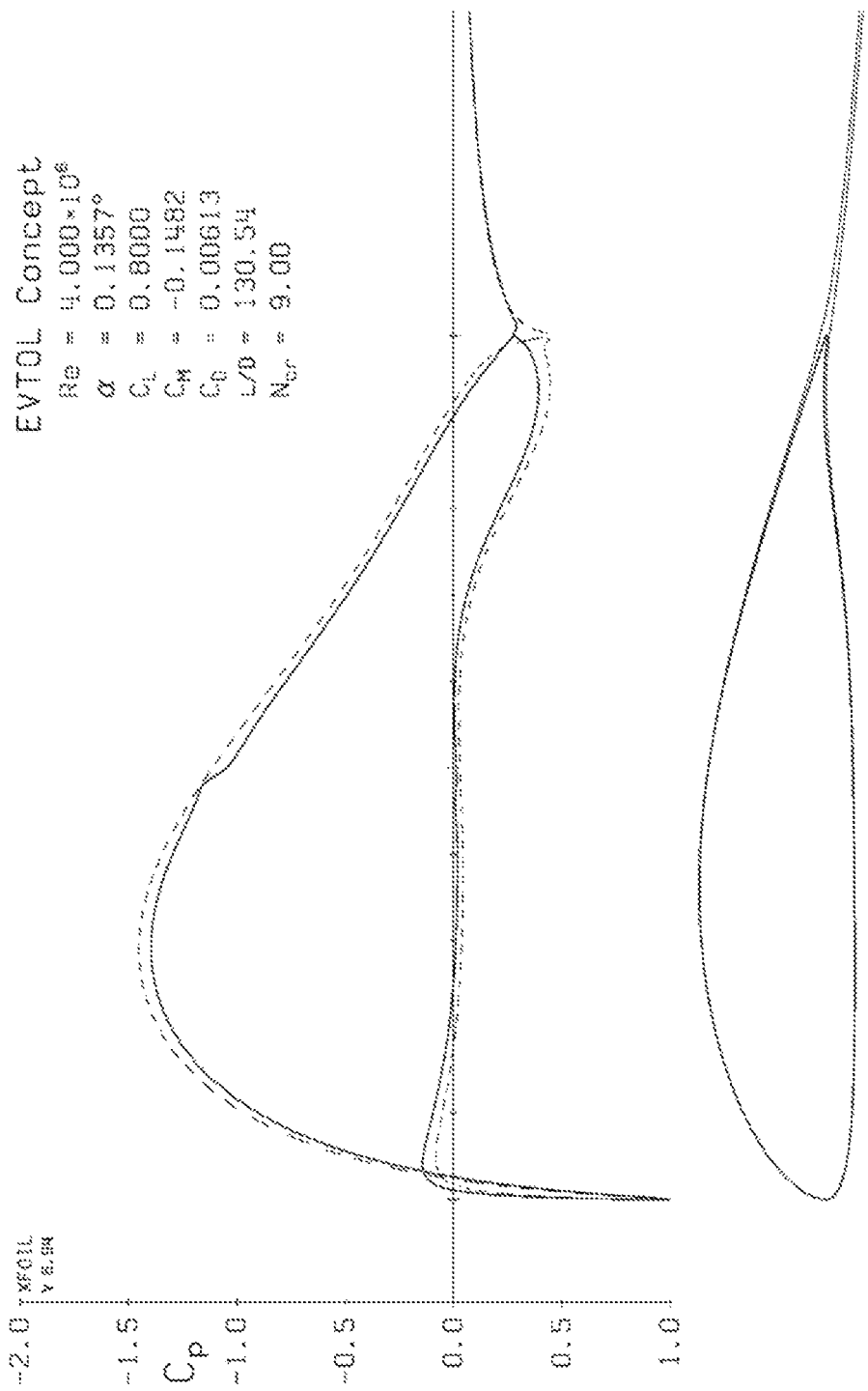
FIGS. 4-6 are plots of calculated aerodynamic characteristics of the airfoil of FIGS. 3A-B.

The clean configuration of this section, according to the illustrated example, has aerodynamic properties as shown in FIG. 4 which plots the pressure distribution above and below the airfoil depicted for the parameters listed in the plot. Although FIG. 4 pertains to the specific wing configuration depicted, it will be appreciated that the wings, flaps, and ailerons may have any other practicable geometry without departing from the scope of the present disclosure. The wing section depicted has a high thickness to chord ratio of −20%. In addition, the aerodynamic properties hold up very well at low Reynolds numbers as shown below. However, any other practicable thickness to chord ratio may be utilized without departing from the scope of the present disclosure.

Figure 5:
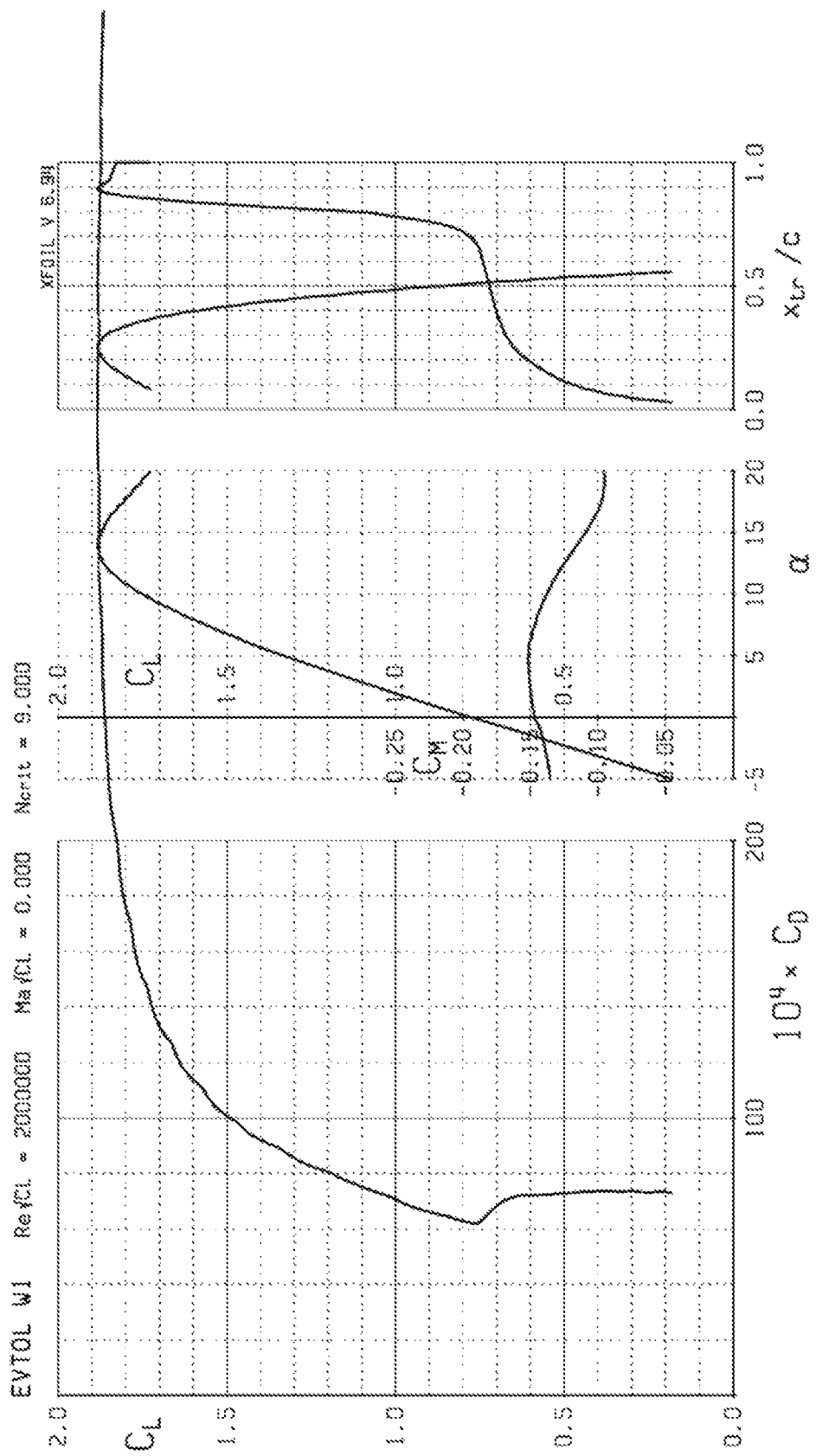
Figure 6:
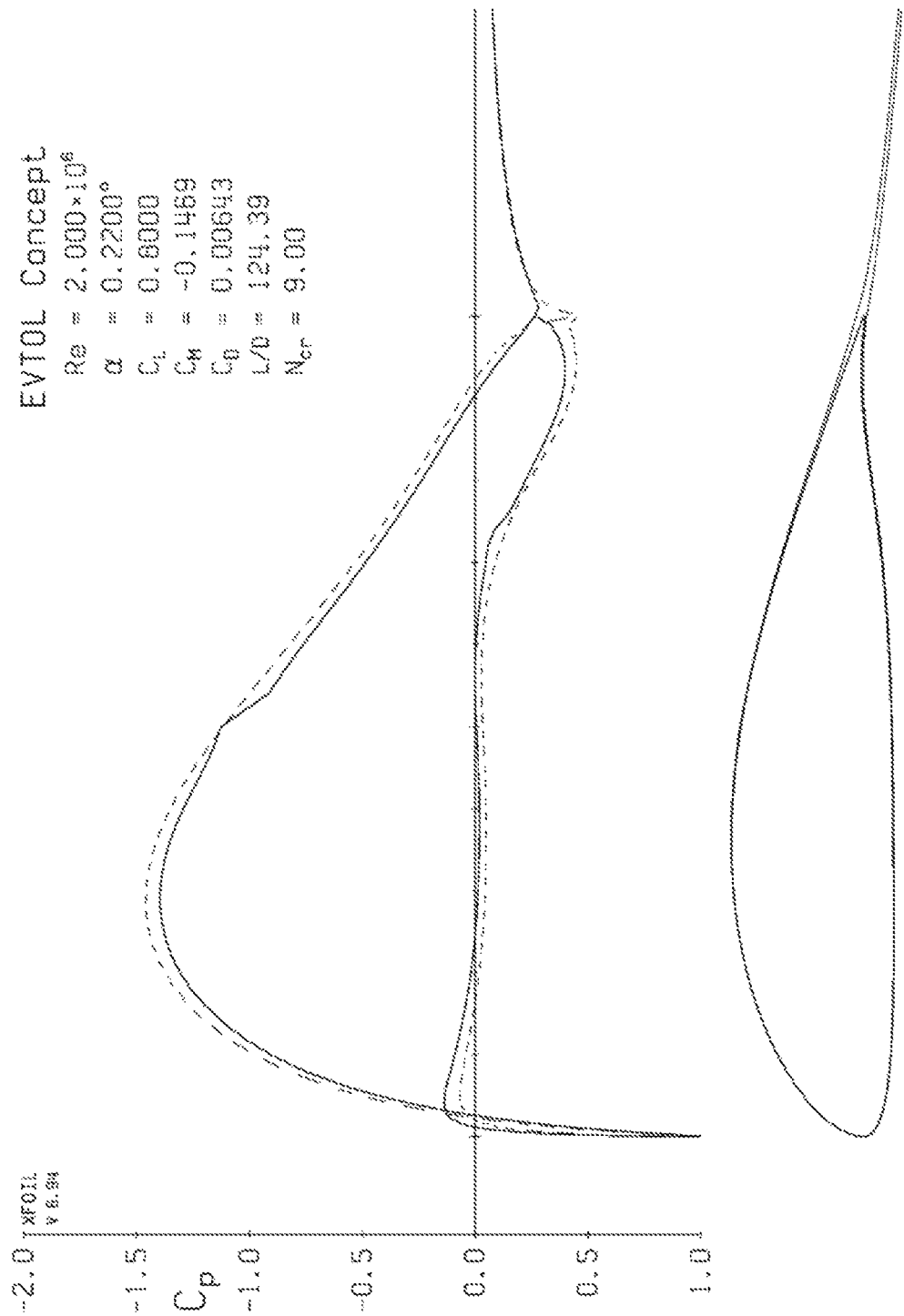

Further aerodynamic characteristics are shown in FIG. 5 which plots lift coefficient as a function of drag coefficient (left panel; lift coefficient and pitching moment vs. angle of attack (middle panel); and lift coefficient and pitching moment as a function of transition point location along the airfoil. Meanwhile, FIG. 6 shows pressure distributions of the wing configuration of FIG. 4 at a Reynolds number equal to $2.0 \times 10^6$ compared to $4.0 \times 10^6$ as shown in FIG. 4.

It is common for the configuration of aircraft flaps to be varied between discreet configurations with varying degrees of flap rotation and extension of the flaps beyond the trailing edge of the wing when the flaps are fully retracted. FIGS. 7A-7F illustrate intermediate configurations of flaps 732 for a wing 720 (e.g., a wing 120, 320) that would be identified with the acceleration phase of the transition from a hovering flight mode in a VTOL-aircraft to a horizontal cruising flight mode. During such a transition from hovering to cruising, low drag, increased lift, and high lateral control power are desired characteristics.

Figure 7A:
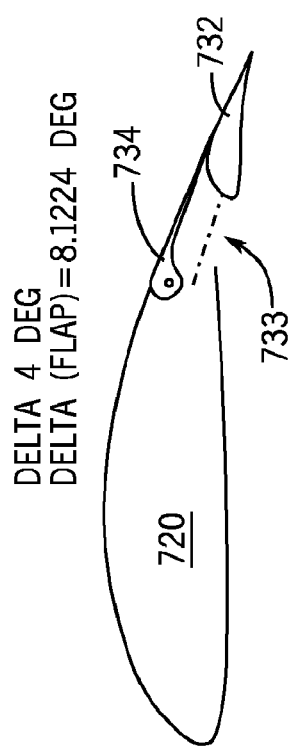
FIGS. 7A-F are cross-sectional schematic views of an airfoil provided with a compound control surface according to embodiments disclosed herein in different configurations.
Figure 7B:
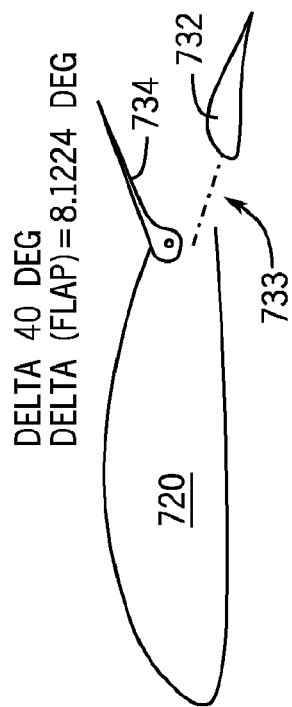

FIGS. 7A-7B show a first flap setting for the flap 732 of the wing 720. FIG. 7A shows the aileron 734 in its neutral position, while FIG. 7B shows the aileron 534 extended upward as it might be while executing a banking turn or other lateral control maneuver. The flap 732 may be extended using one or more extendable trusses or other support structure 733. The support structure 733 is not visible in the cross-sectional sections depicted and is indicated by a dashed line connecting the leading edge of the flap 732 to its approximate neutral position within the body of the wing 720.

Figure 7C:
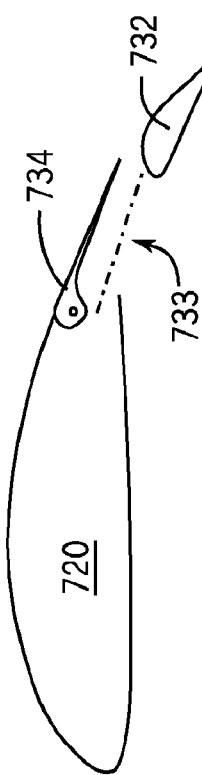
Figure 7D:
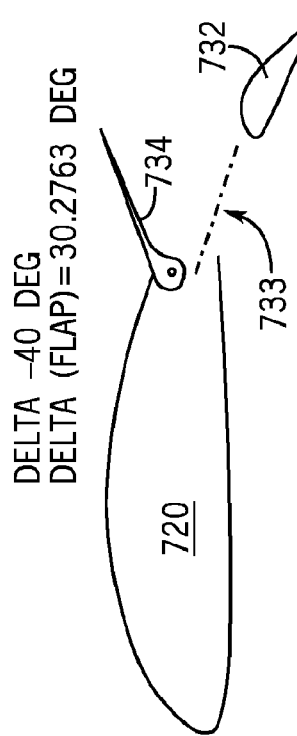
Figure 7E:
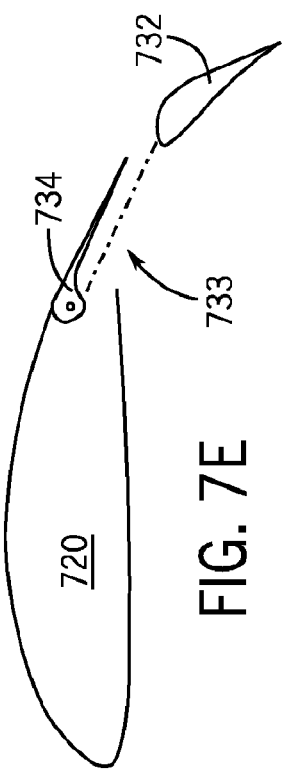
Figure 7F:
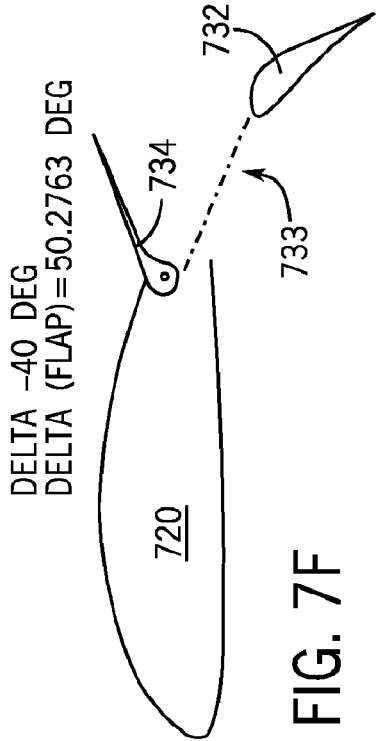

FIGS. 7C-7D show a second flap setting for the flap 732 of the wing 720. FIG. 7C shows the aileron 734 in its neutral position, while FIG. 7D shows the aileron 734 extended upward as it might be extending while executing a banking turn or other lateral control maneuver. FIGS. 7E-7F show a third flap setting for the flap 732 of the wing 720. FIG. 7E shows the aileron 734 in its neutral position, while FIG. 7F shows the aileron 734 extended upward as it might be extending while executing a banking turn or other lateral control maneuver. FIGS. 7C-7D represent a maximum CL configuration having high lateral control power in addition to high CL, which pays dividends in the cruise phase in aircraft with reduced wing area.

Figure 8:
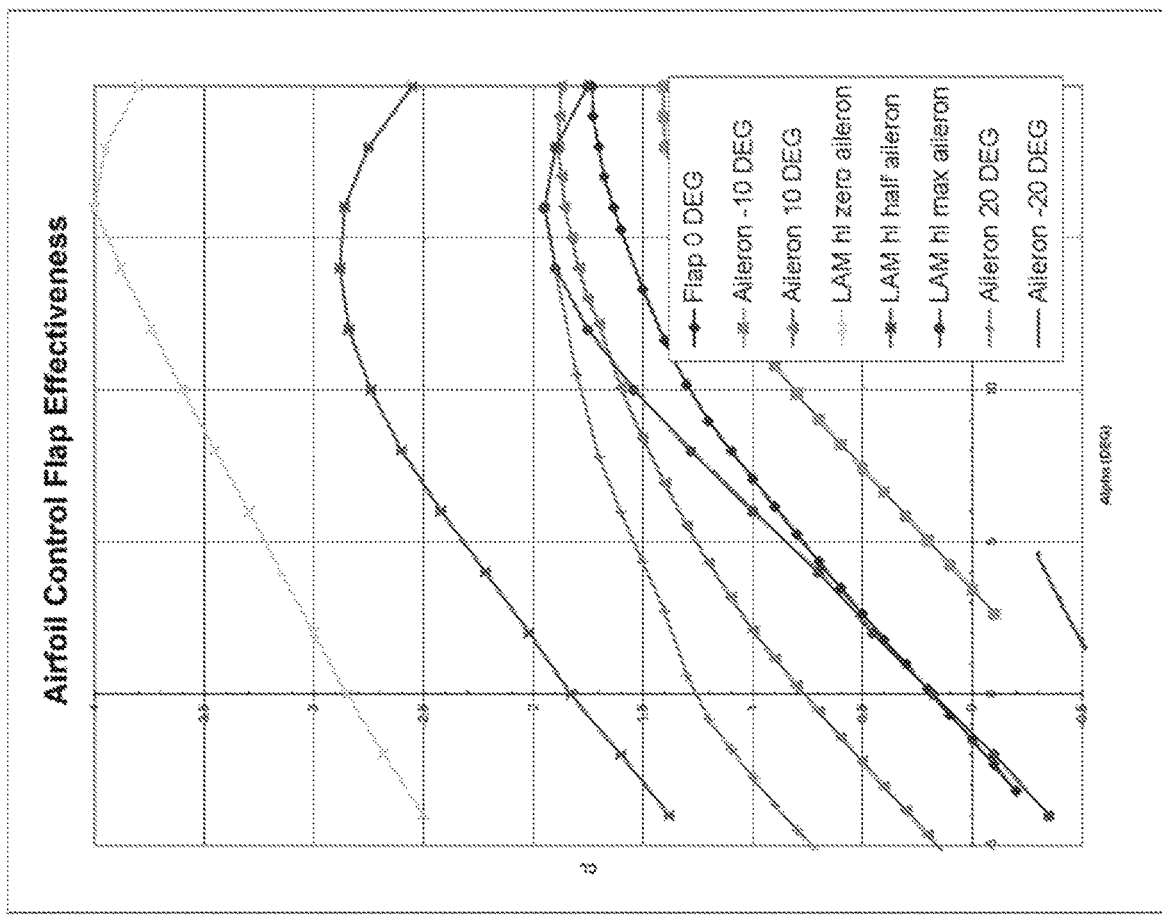
FIG. 8 is a plot comparing the effectiveness of airfoils provided with compound control surfaces disclosed herein with the effectiveness of conventional airfoils.

The data illustrated in FIG. 8 shows the effectiveness of conventional control flap panels at low lift coefficients. At high lift coefficients (near stall) the effectiveness of the conventional control flap panel is degraded. Conventional control flap panels also work well with small deflections and the control response with larger deflections is not proportional. The vertical space between the lines is the control effectiveness. The system disclosed herein maintains full control authority up to and past the stall lift coefficient.

Figure 9:
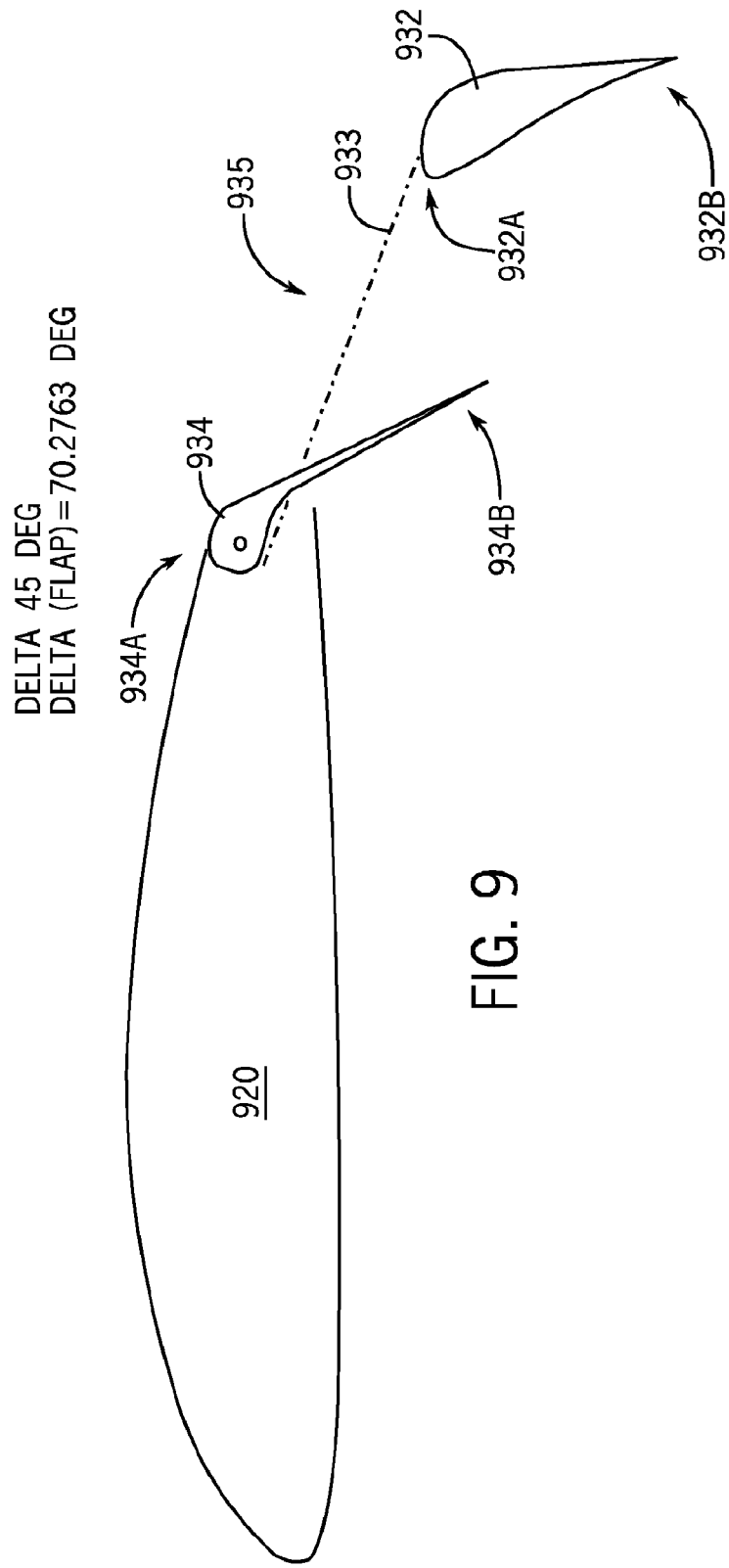
FIG. 9 is cross-sectional schematic views of an airfoil provided with a compound control surface according to embodiments disclosed herein in a configuration optimized for hovering (vertical) flight modes.

Unlike the wings of conventional horizontal-flight aircraft, VTOL aircraft must accommodate a hovering flight mode used for vertical take-off and landing. FIG. 9 depicts a wing 920 in a configuration intended to reduce blockage of the downward flow from one or more hover rotors which may be positioned above the wing 920. Movement of the flap 932 in this configuration makes yaw control possible. Notably, in the configuration of wing 920 shown in FIG. 9, the flap 932 is extended significantly behind what would be the trailing edge of the wing 920 in a neutral configuration (such as the configuration of the wing 920 shown in FIG. 3A). In this configuration, the aileron 934 may be pivoted downward at its leading edge 934A such that its trailing edge 934B travels through the open space 935 between the body of the wing 920 and the leading edge 932A of the extended flap 932 formed by extension of the flap 932 into the position shown (with its trailing edge 932B pointing substantially downward relative to the body of the wing 920). As an example this, movement is possible when the span of the aileron 934, i.e., its lateral extent in a direction along the span of the wing 920 (perpendicular to the cross-sectional plane of the wing 920 depicted) is less than the lateral extent between the elements of the support structure 933 of the flap 932. Alternatively, as another non-limiting example, the aileron 934 may be slotted so that it wraps around one or more elements of the support structure 933 when deployed as pictured. A width of the open space 935 may be defined as an extent in a direction parallel to the span of the wing 920 and a depth of the open space may be defined in a direction substantially perpendicular to the span of the wing 920.

Figure 10:
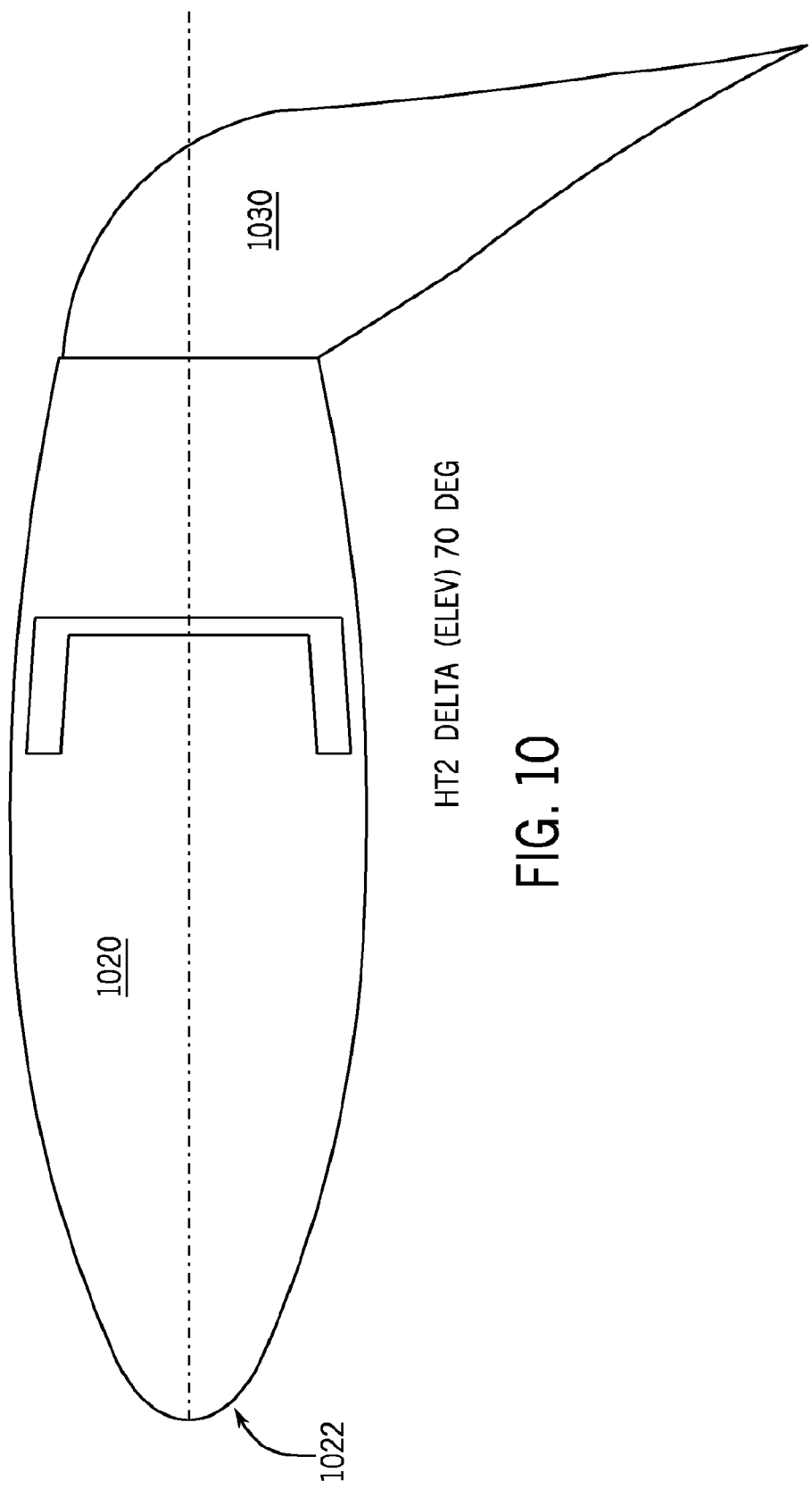
FIG. 10 is cross-sectional schematic views of an alternate airfoil provided with a compound control surface according to embodiments disclosed herein in a configuration optimized for hovering (vertical) flight modes.

In some embodiments the hovering flight mode may be enabled by a wing such as the wing 1020 of FIG. 10 in which, a horizontal airfoil 1030 may be implemented. The airfoil shown can place a great emphasis on high thickness ratio and cross section. For example, section HT2 of FIG. 10 has a thickness ratio of >20%. However, any other practicable thickness may be utilized without departing from the scope of the present disclosure. In some embodiments, the depicted horizontal airfoil may be formed by coordinated motion of a compound control surface with a flap and aileron as previously depicted.

Figure 11:
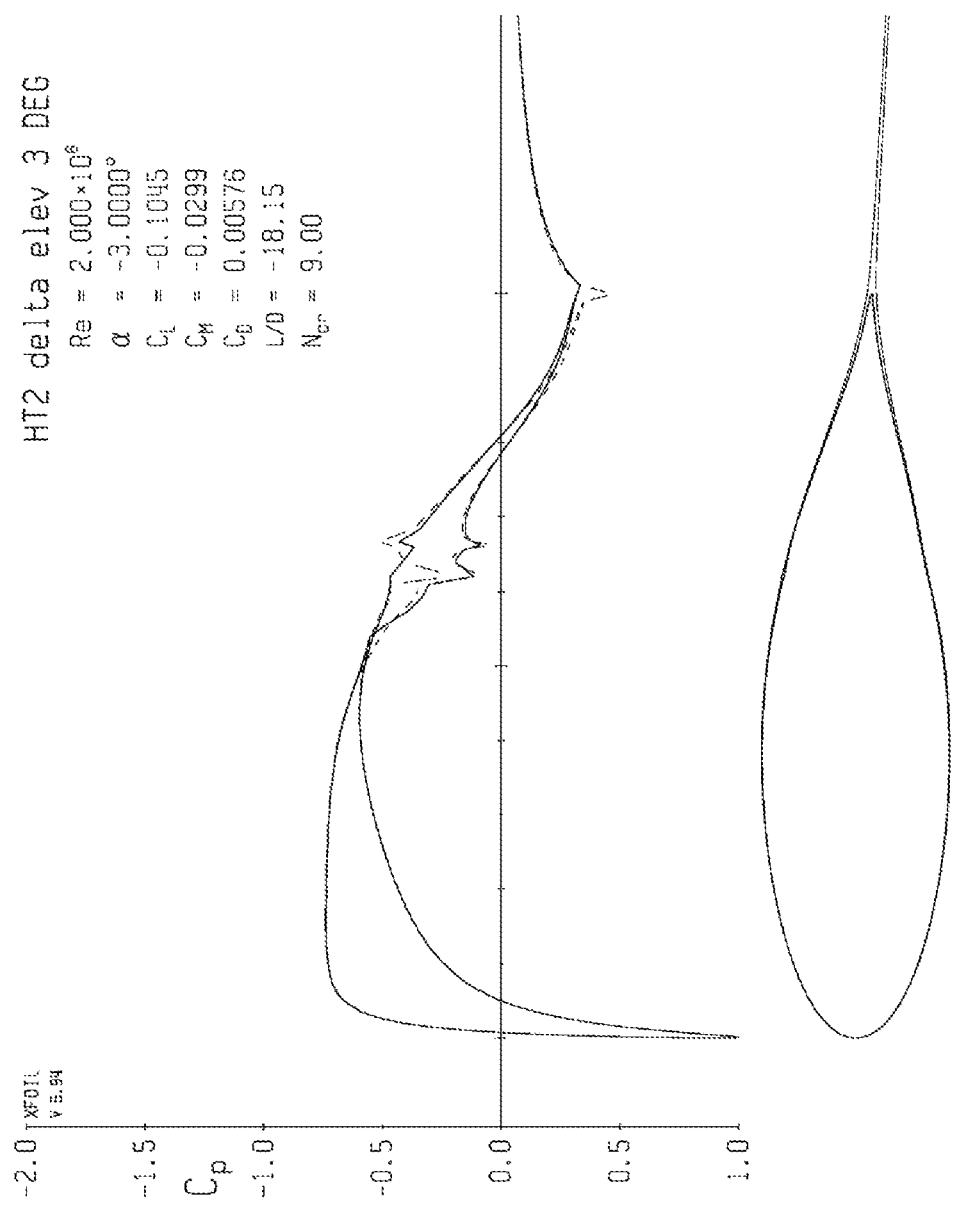
FIGS. 11-14 are plots of calculated aerodynamic characteristics of the airfoil of FIG. 10.
Figure 12:
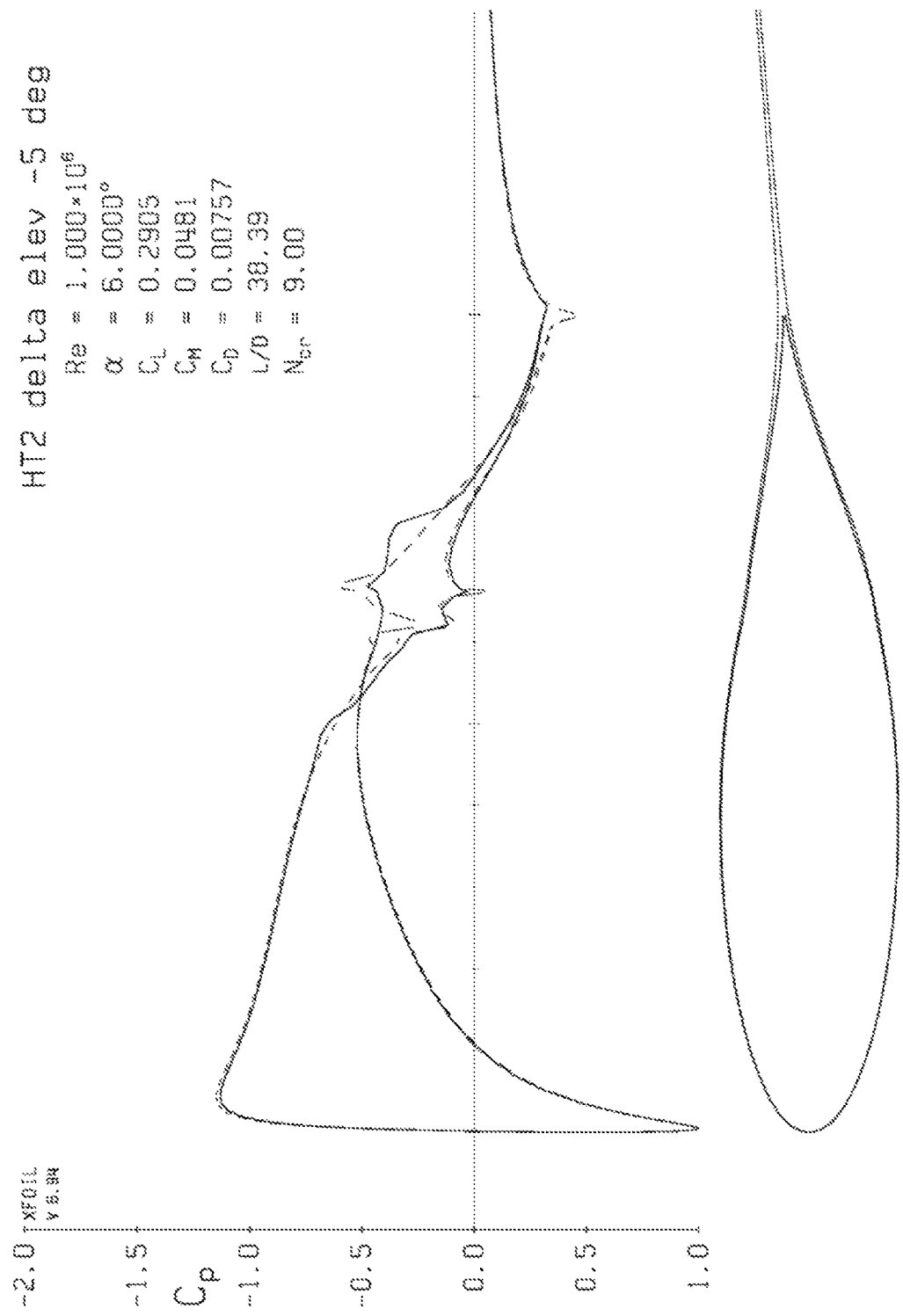
Figure 13:
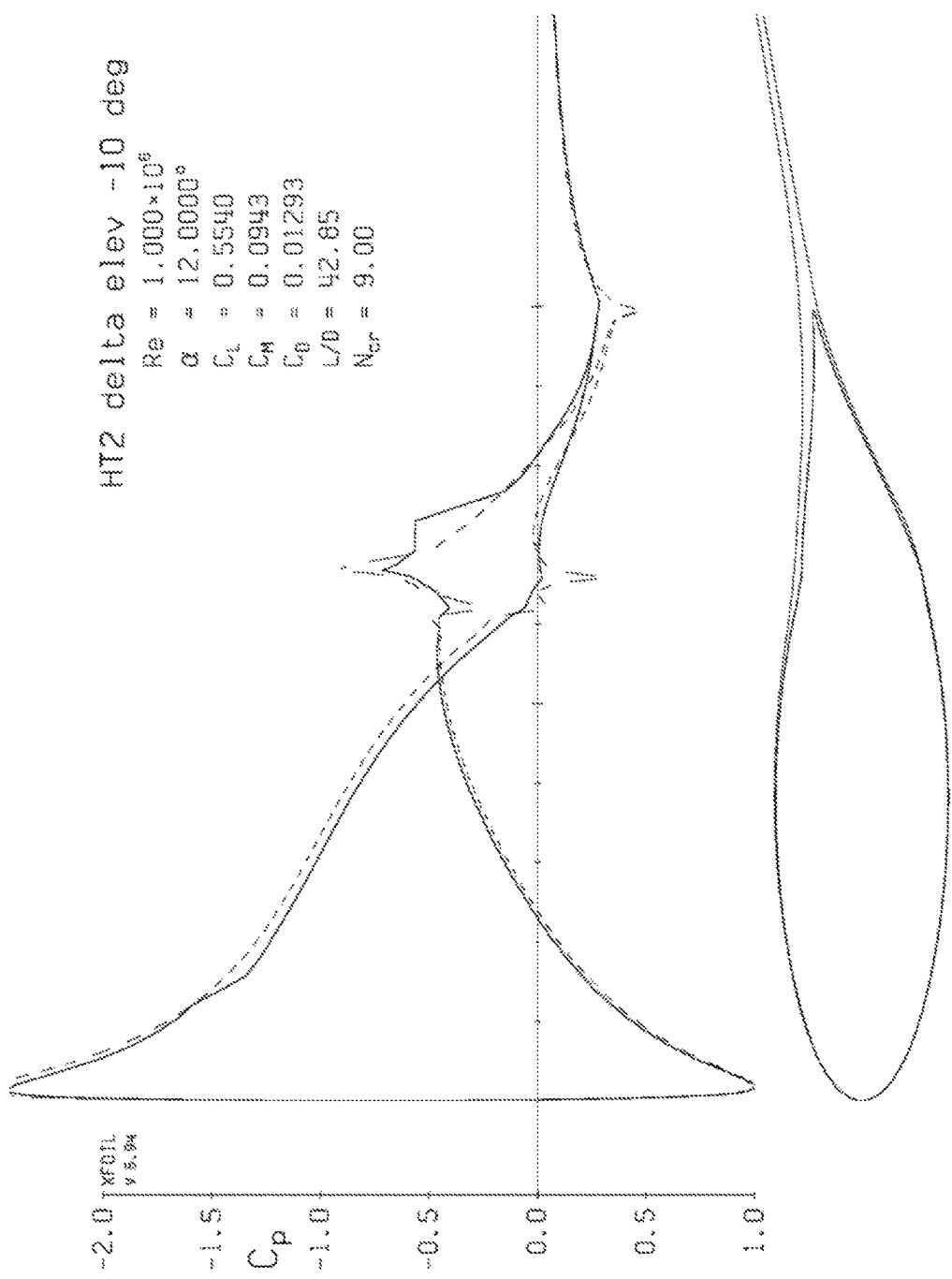

Aerodynamic characteristics of the wing 1020 in various horizontal cruising configurations are depicted in FIGS. 11-14. FIGS. 11-13 show pressure distributions above and below the airfoil as depicted below each chart under the aerodynamic conditions indicated in the legend for that chart. FIG. 11 depicts aerodynamic performance of a cruise trim configuration where the lift is negative, and the control flap panel deflection is positive. FIG. 12 depicts aerodynamic performance of a slow-speed trim configuration where the lift is positive, and the control flap panel deflection is negative. FIG. 13 depicts aerodynamic performance of an even slower-speed trim configuration where the lift is more positive, and the control flap panel deflection is more negative than that of the preceding case.

Figure 14:
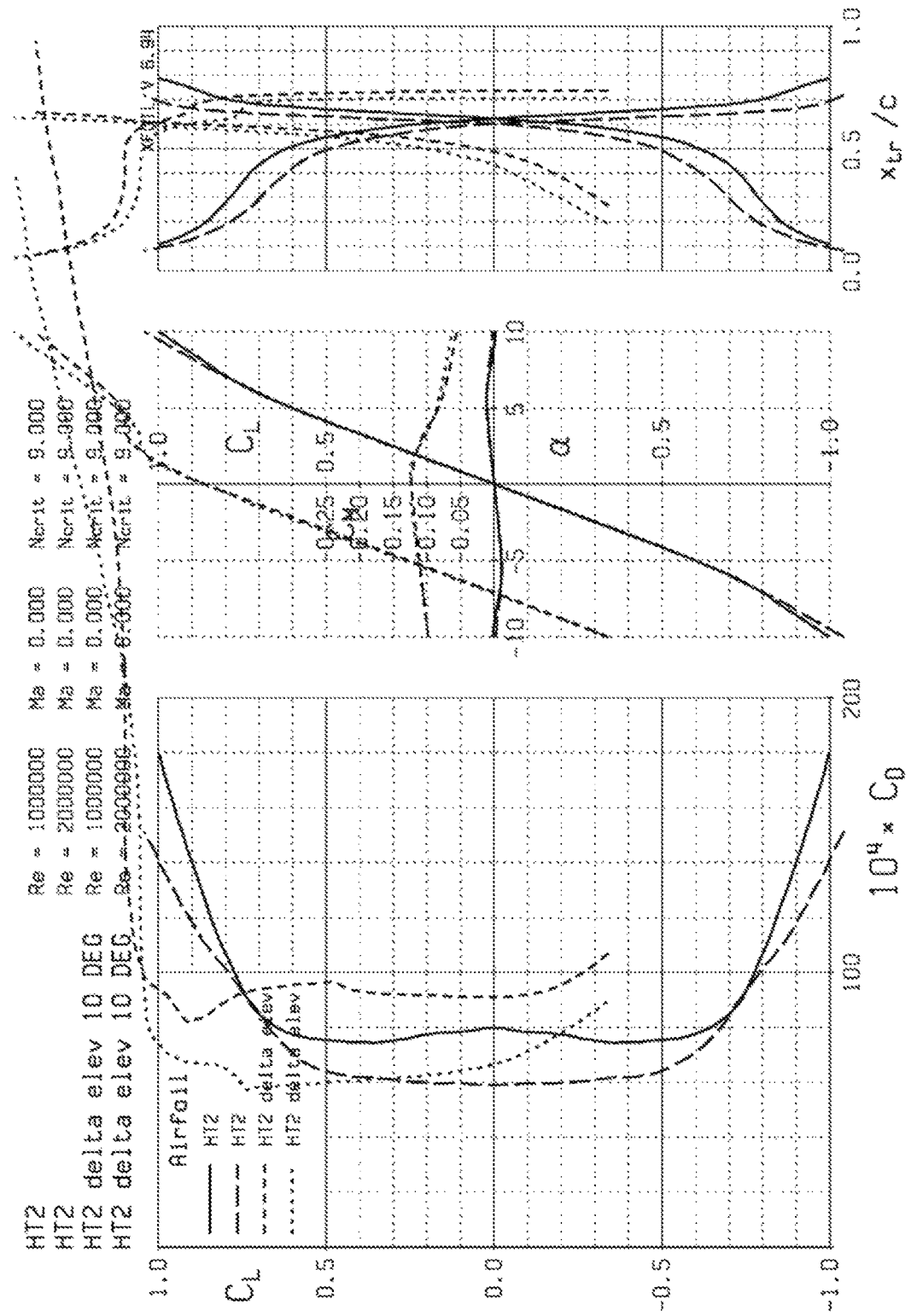

FIG. 14 plots various aerodynamic characteristics for two configurations of the wing 1020 at two different Reynold's number values: a baseline configuration, and a configuration where the horizontal airfoil 1030 is elevated 10 degrees for Reynolds number values of $2 \times 10^6$ and $4 \times 10^6$.

In some implementations, the position of the aileron panels may be determined in view of a number of factors. For example, when the vehicle is at cruising speed, the amount of aileron panel deflection may be minimal. This is possible because at high-speed even very small deflections of the vehicle's conventional aileron panels are sufficient to control the vehicle. When the vehicle is at low-speed (e.g., preparing to land, such as operating in a transition phase between cruising and hovering and/or hovering), however, the amount of aileron panel deflection may be increased substantially. This enables the aileron panels to provide assistance in controlling the vehicle at relatively low-speed. As such, an ECU such as the ECU 205 could use a scaling factor to determine the degree to which the aileron panels should be moved. The scaling factor could be selected so that high-speed maneuvers cause an appropriately small movement of the upper aileron panels (if at all), while low-speed maneuvers could result in a much larger movement of the aileron panels and, thereby, greater assistance in controlling the vehicle adjusted as to need. In such an implementation, the ECU may use factors such as vehicle speed, dynamic pressure, and/or density of surrounding air to determine whether the vehicle is undergoing a high or low-speed maneuver. As such, the ECU can be configured to determine a factor that can be applied to the detected movement of the conventional aileron panels to determine the degree to which the aileron panels should be deflected.

Figure 15:
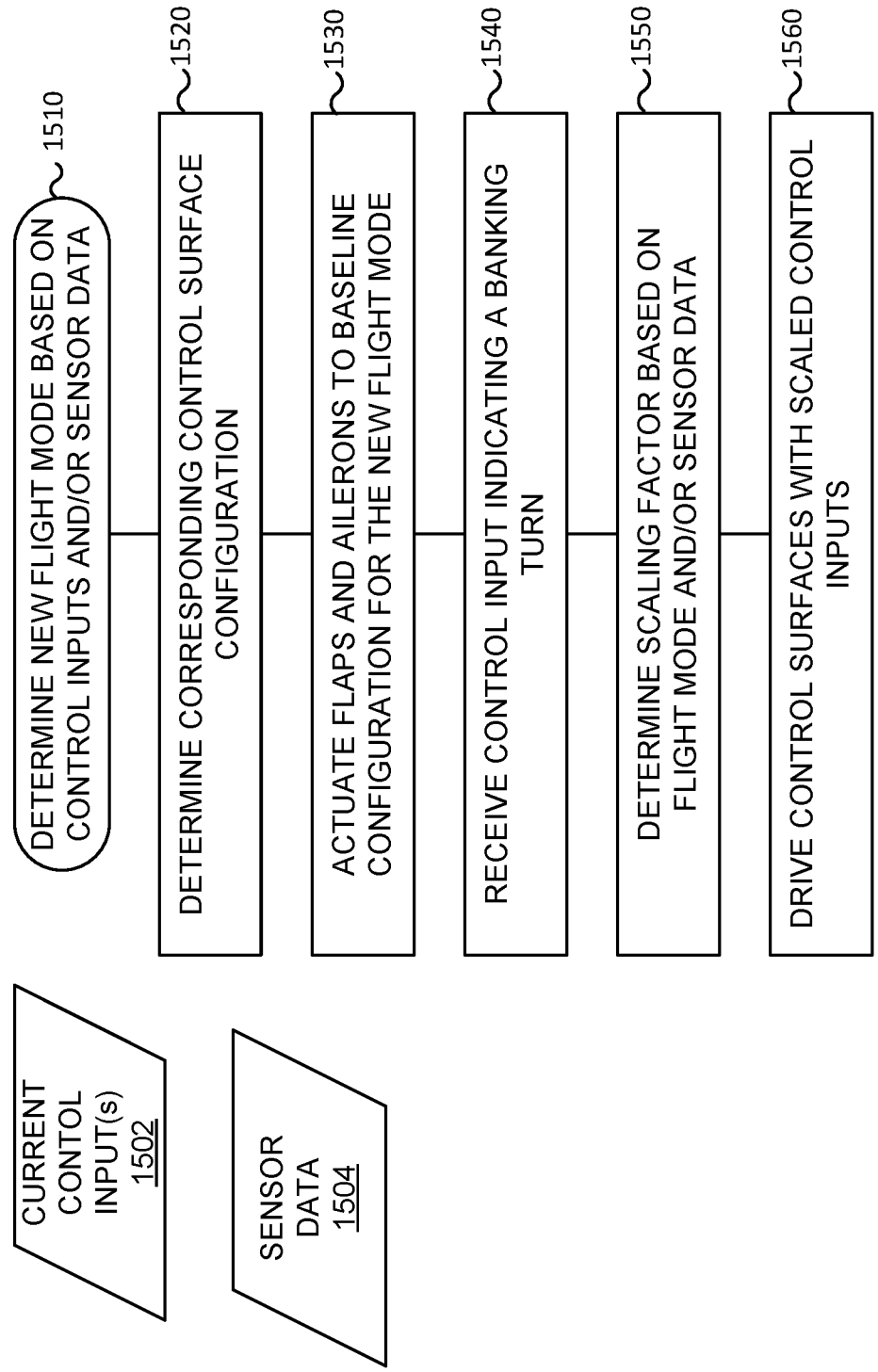
FIG. 15 is a flowchart of an example method of controlling an aircraft provided with control surfaces according to embodiments disclosed herein.

FIG. 15 illustrates an example method 1500 of controlling the control surfaces of an aircraft such as the aircraft 100 with compound control surfaces such as the control surfaces 130, 230 that may be performed by a system such as the flight control system 200 using an electronic control unit such as the ECU 205. At step 1510, the system receives control inputs 1502 (e.g., the control inputs 202) and optionally receives sensor data 1504 (e.g., the sensor data 204) and determines a new (or current) flight mode. For instance, the system may determine that based on one or both of the control inputs 1502 and sensor data 1504 that the aircraft is in a hovering flight mode, a horizontal cursing flight mode, one or more transitional flight modes, or another flight mode.

At step 1520 the system may determine a control surface configuration corresponding to the flight mode. For example, the system may determine, either in response to a control input 1502 that identifies the flight mode (e.g., a cockpit switch) or sensor data indicating the flight mode such as barometric pressure, airspeed, attitude indicators, or any other suitable sensor data 1504 that the aircraft (e.g., the aircraft 100) has entered a hovering flight mode.

At step 1530 the system may actuate flaps and ailerons (e.g., flaps 932 and ailerons 934 of wings 920) to place them into a configuration optimized for hovering flight such as the configuration depicted in FIG. 9.

At step 1540 the system may receive a control input 1502 such a control yoke or side stick displacement indicating initiation of a banking turn. At step 1550, the system may determine an appropriate scaling factor to apply in order to convert the appropriate control input into an appropriate control signal to drive the appropriate control surfaces. The system could also integrate flight control surface deflections with adjustments of the propulsion system. For instance, as disclosed above, the system may scale control input by a small scaling factor when the sensor data indicates the aircraft is traveling at high airspeed and apply a larger scaling factor when the sensor data 1504 indicate that the aircraft is travelling at low airspeed. Alternatively, or in addition, the system may use the current flight mode determined at step 1510 to determine the appropriate scaling factor(s) to apply.

At step 1560, the system drives the appropriate control surfaces (an aileron such as the aileron 934 or a flap such as the flap 932) with appropriately scaled signal to actuate that control surface. For instance, in a hovering flight mode, the system may accomplish a banking turn by applying an appropriately scaled control yoke displacement signal to an appropriate flap. Alternatively, in a horizontal cruising mode, the system may scale the same control yoke displacement signal with a scaling factor determined by the current airspeed and raise an aileron (e.g., the aileron 334 as shown in FIG. 3B) on a wing closest to the intending banking direction as disclosed above.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

It is also important to note that the construction and arrangement of the elements of the invention as shown in the examples are illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting. In addition, variations and modifications can be made on the aforementioned structures and methods without departing from the concepts of the present invention and such concepts are intended to be covered by the following claims unless these claims by their language expressly state otherwise.

The invention claimed is:

1. A vertical take-off-and-landing aircraft comprising:
a fuselage;
a propulsion system connected to the aircraft;
a first wing coupled to the fuselage, the first wing including a first compound control surface at a trailing edge of the first wing, the first compound control surface comprising a first flap panel and a upper first aileron disposed directly above the first flap, the first aileron and the first flap being both simultaneously and independently operable with each other;
a second wing coupled to the fuselage, the second wing including a second compound control surface at a trailing edge of the second wing, the second compound control surface comprising a second flap panel and an upper second aileron disposed directly above the second flap, the second aileron and the second flap being both simultaneously and independently operable with each other; and
a flight control system configured to operate the aircraft in a hovering flight mode and a horizontal cruising flight mode;
wherein, when the aircraft is operated in the hovering flight mode:
the propulsion system generates downward thrust in a direction substantially perpendicular to a plane defined by the first and second wings;
the first and second flaps are pivoted about leading edges of the first and second flaps, respectively, such that trailing edges of the first and second flaps are angled downward with respect to the trailing edges of the first and second wings, respectively; and
the first and second ailerons are pivoted, respectively, about leading edges of the first and second ailerons such that trailing edges of the first and second ailerons are angled downward with respect to the trailing edges of the first and second wings, wherein the flight control system responds to a control input corresponding to a lateral motion in a selected directed by actuating the flaps of the first and second wings without actuating the ailerons of the first and second wings to move the aircraft in the selected direction; and
wherein, when the aircraft is operated in the horizontal cruising flight mode, the first and second upper ailerons are configured to perform their functions with upward deflection only.

2. The aircraft of claim 1, wherein when the aircraft is operated in the horizontal flight mode, the flight control system responds to a control input corresponding to a banking turn toward a direction nearest the first wing by:
actuating the first aileron upward with respect to the first wing; and maintaining the second aileron in a neutral position with respect to the second wing.

3. The aircraft of claim 1, wherein when the aircraft is operated in the hovering flight mode:
the first flap is pivoted downward from a neutral position of that flap and the first aileron is pivoted downward from a neutral position of that aileron such that a bottom surface of the first aileron rests on a top surface of the first flap and forms a single airfoil with the first flap; and
the second flap is pivoted downward from a neutral position of that flap and the second aileron is pivoted downward from a neutral position of that aileron such that a bottom surface of the second aileron rests on a top surface of the second flap and forms a single airfoil with the second flap.

4. The aircraft of claim 1, wherein when the aircraft is operated in the hovering flight mode:
the leading edges of the first and second flaps are extended away, respectively, from the trailing edges of the first and second wings forming open spaces deeper than chords of the first and second ailerons and wider than spans of the first and second ailerons;
wherein, when the first and second ailerons are pivoted, respectively, about the leading edges of the first and second ailerons:
trailing edges of the first and second ailerons pass through the open spaces; and
the trailing edges of the first and second ailerons extend, respectively, below the leading edges of the first and second flaps and allow air to flow through apertures formed between top surfaces of the first and second ailerons and top surfaces of the first and second flaps.

5. The aircraft of claim 1, wherein when the aircraft is operated in the hovering flight mode, the flight control system responds to a control input corresponding to a lateral motion in a selected directed by maintaining the ailerons of the first and second wings at a fixed downward deflection with respect to the first and second wings.

6. The aircraft of claim 1, wherein, when the aircraft is operated in the horizontal flight mode the flight control system responds to a control input indicating a banking turn by:
receiving a displacement signal indicating an amount of displacement of a control device from a neutral position and a displacement direction of the control device;
generating a first electronic control signal proportional to the amount of the displacement of the control device and related to a magnitude of the displacement signal by a first mathematical constant; and
using the first electronic control signal to modify at least one of an electronic, hydraulic, or electronic servo coupled to one of the first and the second aileron to execute the banking turn according to the control input indicating the banking turn.

7. The aircraft of claim 6, wherein, when the aircraft is operated in a transitional flight mode the flight control system responds to the control input indicating the banking turn by:
receiving the displacement signal indicating the amount of displacement of the control device from the neutral position and the displacement direction of the control device;
generating a second electronic control signal proportional to the amount of the displacement of the control device and related to the magnitude of the displacement signal by a second mathematical constant having a greater absolute value than the first mathematical constant; and
using the second electronic control signal to modify a position of one of the first and the second ailerons to execute the banking turn according to the control input indicating the banking turn.

8. The aircraft of claim 6, wherein generating the first electronic control signal comprises:
receiving, by the flight control system, sensor data indicating an airspeed of the aircraft;
retrieving a value of the first mathematical constant corresponding to the airspeed of the aircraft from an electronic memory storing a set of values of the first mathematical constant, each value corresponding to a different airspeed value.

9. A vertical take-off-and-landing aircraft comprising:
a body; a propulsion system coupled to the aircraft; and airfoils, each airfoil having a compound control surface at a trailing edge of the that airfoil, each compound control surface comprising a flap and an aileron disposed directly above the flap, the aileron and the flap being simultaneously operable with each other;
a flight control system configured to operate the aircraft in a hovering flight mode and a horizontal cruising flight mode;
wherein, when the aircraft is operated in the hovering flight mode:
the propulsion system generates downward thrust;
the flaps of each airfoil are pivoted about leading edges of those flaps such that trailing edges of those flaps are angled downward with respect to the trailing edges of that airfoil;
the ailerons of each airfoil are pivoted about leading edges those ailerons such that trailing edges those ailerons are angled downward with respect to the trailing edge of that airfoil, wherein the leading edge of the flap of each airfoil is extended away from a trailing edge of that airfoil, forming an open space wider than a chord of the aileron of that airfoil and longer than a span of the flap of that airfoil;
wherein, when the aileron of each airfoil is pivoted about the leading edge of the aileron of that airfoil;
a trailing edge of the aileron of that airfoil passes through the open space; and
the trailing edge of the aileron of that airfoil extends below the leading edge of the flap of that airfoil and allows air to flow through an aperture formed between a top surface of aileron of that airfoil and a top surface of the flap of that airfoil; and
wherein, when the aircraft is operated in the horizontal cruising flight mode:
the aileron of each airfoil is configured to be deflected upward only beyond a neutral position of that aileron; and
the flight control system responds to a control input indicating a banking turn by:
actuating an aileron of an airfoil nearest a direction of the banking turn upward with respect to that airfoil; and
maintaining ailerons of other airfoils in neutral position with respect to those airfoils.

10. The aircraft of claim 9, wherein when the aircraft is operated in the hovering flight mode:
the flap of each airfoil is pivoted downward from a neutral position of that flap and the upper aileron panel of that airfoil is pivoted downward from a neutral position of the aileron such that a bottom surface of the aileron of that airfoil rests directly above a top surface of the flap of that airfoil and forms a single downward extension of that airfoil with the flap of that airfoil.

11. The aircraft of claim 9, wherein when the aircraft is operated in the hovering flight mode, the flight control system responds to a control input corresponding to a lateral motion in a selected directed by actuating the flaps of the of the airfoils while preventing actuation of the ailerons of the airfoils.

12. The aircraft of claim 9, wherein when the aircraft is operated in the hovering flight mode, the flight control system responds to a control input corresponding to a lateral motion in a selected directed by actuating the flaps of the first and second airfoils without actuating the ailerons of the first and second airfoils to move the aircraft in the selected direction.

13. The aircraft of claim 9, wherein, when the aircraft is operated in the horizontal flight mode the flight control system responds to a control input indicating a banking turn by:
receiving a signal indicating a desired banking angle;
receiving sensor data indicating a current banking angle;
generating a first electronic control signal proportional to a difference value between the current banking angle and the desired banking angle and related to the difference value by a first mathematical constant; and
transmitting the first electronic control signal to an appropriate aileron while maintaining other ailerons in neutral positions.

14. The aircraft of claim 13, wherein generating the first electronic control signal comprises:
receiving, by the flight control system, sensor data indicating an airspeed of the aircraft;
retrieving a value of the first mathematical constant corresponding to the airspeed of the aircraft from an electronic memory storing a set of values of the first mathematical constant, each value corresponding to a different airspeed value.

15. A method of controlling a vertical take-off-and-landing aircraft, comprising:
determining, at a first time, that the aircraft has entered a hovering flight mode and, when the aircraft enters the hovering flight mode, causing a flight control system of the aircraft to perform the steps of:
causing a propulsion system of the aircraft to generate downward thrust in a direction substantially perpendicular to a plane defined by a first wing of the aircraft and a second wing of the aircraft;
pivoting a first flap disposed at a trailing edge of a first wing of the aircraft about a leading edge of the first flap; and pivoting a second flap disposed at a trailing edge of a second wing of the aircraft about a leading edge of the of the first and second flap such that trailing edges of the first and second flaps are angled downward with respect to the trailing edges of the first and second wings; and
pivoting a first aileron disposed directly above the first flap about a leading edge of the first aileron; and pivoting a second aileron disposed directly above the second flap about a leading edge of the second aileron, such that the trailing edges of the first and second ailerons are angled downward with respect to the trailing edges of the first and second wings;
wherein placing the aircraft in the hovering flight mode includes causing the flight control system to perform steps of:
extending leading edges of the first flap away from the trailing edge of the first wing and extending the second flap away from the trailing edge of the second wing, thereby forming:
a first open space deeper than a chord of the first aileron and wider than a span of the first aileron between the first wing and the leading edge of the first flap; and a second open space deeper than a chord of the second aileron and wider than a span of the second aileron between the second wing and the leading edge of the second flap and the second aileron; and
causing the flight control system, while pivoting the first and second ailerons about the leading edges of the first and second ailerons, to:
cause the trailing edge of the first aileron to pass through the first open space and cause the trailing edge of the second aileron to pass through the second open space; and
cause the trailing edges of the first and second ailerons to extend below the leading edges of the first and second flaps, respectively, thereby allowing air to flow through apertures formed between top surfaces of the first and second ailerons and top surfaces of the first and second flaps; and
determining, at a second time, that the aircraft has entered a horizontal cruising flight mode and, while the aircraft is in the horizontal cruising flight mode, causing the flight control system of the aircraft to prevent the first and second ailerons from rotating downward past neutral positions of those ailerons.

16. The aircraft method of claim 15, the method further comprising:
executing a banking turn while operating the aircraft in the horizontal cruising flight mode, by transmitting a control input indicating a banking turn toward a direction nearest the first wing to the flight control system, thereby causing the flight control system to perform the steps of:
actuating the first aileron upward with respect to the first wing; and
maintaining the second aileron in a neutral position with respect to the second wing.

17. The aircraft method of claim 15, wherein the method further comprises placing the aircraft in the hovering flight mode by causing the flight control system to perform the steps of:
pivoting the first flap downward from a neutral position of that first flap and pivoting the first aileron downward from the neutral position of the first aileron such that a bottom surface of the first aileron rests on the top surface of the first flap and forms a single airfoil with the first flap; and
pivoting the second flap downward from a neutral position of that the second flap and pivoting the second aileron downward from the neutral position of the second aileron such that a bottom surface of the second aileron rests on the top surface of the second flap and forms a single airfoil with the second flap.

\* \* \* \* \*